(12) United States Patent
Takahashi et al.

(10) Patent No.: US 7,883,022 B2
(45) Date of Patent: *Feb. 8, 2011

(54) IC CARD AND MANUFACTURING METHOD OF THE SAME

(75) Inventors: Isao Takahashi, Tokyo (JP); Junichi Sawada, Tokyo (JP)

(73) Assignee: Sony Corporation, Tokyo (JP)

( * ) Notice: Subject to any disclaimer, the term of this patent is extended or adjusted under 35 U.S.C. 154(b) by 82 days.

This patent is subject to a terminal disclaimer.

(21) Appl. No.: 12/183,661

(22) Filed: Jul. 31, 2008

(65) Prior Publication Data
US 2009/0032603 A1     Feb. 5, 2009

Related U.S. Application Data

(63) Continuation of application No. 10/569,917, filed on Feb. 28, 2006, now Pat. No. 7,451,934.

(51) Int. Cl.
*G06K 19/06* (2006.01)
(52) U.S. Cl. ...................................................... 235/492
(58) Field of Classification Search ................. 235/492, 235/380, 449, 451
See application file for complete search history.

(56) References Cited

U.S. PATENT DOCUMENTS 6,459,588 B1 * 10/2002 Morizumi et al. ........... 361/737

FOREIGN PATENT DOCUMENTS

| JP | 03-023654 | 1/1991 |
| JP | 04-112096 | 4/1992 |
| JP | 08-255811 | 10/1996 |
| JP | 2000-339427 | 12/2000 |
| JP | 2002-325122 | 11/2002 |
| JP | 2002-363383 | 12/2002 |
| WO | WO 02/056247 A1 * | 7/2002 |

* cited by examiner

*Primary Examiner*—Seung H Lee
(74) *Attorney, Agent, or Firm*—SNR Denton US LLP

(57) ABSTRACT

An IC card formed by sandwiching a circuit board formed with an antenna pattern and an IC chip mounted on the circuit board with a plurality of card constituent sheets. Ferrite beads to absorb and remove noises (unnecessary radiation energy) input to and output from the IC chip are mounted on wiring sections interconnecting the antenna pattern and IC chip.

20 Claims, 22 Drawing Sheets

IC CARD AND MANUFACTURING METHOD OF THE SAME

CROSS-REFERENCE TO RELATED APPLICATIONS

This application claims priority to and is a continuation of U.S. patent application Ser. No. 10/569,917, filed Feb. 28, 2006, which claims priority to Japanese Patent Application No. 2003-309103, filed Sep. 1, 2003, the disclosures of all of which are incorporated herein by reference in their entirety to the extent permitted by law.

BACKGROUND OF THE INVENTION

The present invention relates to an IC card provided with an unnecessary radiation countermeasure necessary for securing requested functions, product qualities and the like, and its manufacturing method.

In the field of electric home appliances and computer mobile products, high functionalization is required in the tendency of lighter, thinner, and more compact. The tendency of high functionalization exists also in the card industry. For credit cards and cash cards used heretofore, a main stream of recording data has been embossing and magnetic stripes. However, high functionalization has recently been paid attention, such as multi-function settlements for credits, electronic money and the like by IC cards.

In order to deal with the tendency of this type, a large capacity and a high density have been required for IC chips. The development of enciphering technologies for processing important information and high-speed signal processing technologies among others are made vigorously. Further, not only reading/writing a large amount of information from/in cards, a number of types of various applications have been proposed to positively utilize the information in cards, and a variety of usage types are being born. As the usage types change in various ways, the present circumstance of product qualities of IC cards is a high necessity of satisfying product qualities in various environments/fields, in addition to high security and high-speed processing performance made to date (for example, Japanese Patent Application Publications Nos. HEI-6-336095 and HEI-9-27839 and Japanese Patent Application Publication No. 2001-53487).

As the usage types change in various ways, in addition to high security and high-speed processing performance, qualities required for IC cards are increasing. Among others, the qualities suitable for usage types of portable communication terminals typically IC cards and portable phones are urgently required to become satisfactory, because it is anticipated that the number of users increases rapidly.

Services based on usage types are being developed rapidly, such as confirming record contents (e.g., a card balance) of an IC card by using a display function of a portable communication terminal having a built-in IC card reader/writer. If communications of portable phones and communications between an IC card and a reader/writer are made at the same time, such as an incoming call during a read operation for card information and communications between the IC card and reader/writer during phone service, two communication waves are picked up in the IC card and may be synthesized as a mixed modulation wave in the IC card. There is a possibility that this mixed modulation wave operates as noises on a reception wave of the portable phone, resulting in an incoming call defect, a phone service defect and the like.

If the mixed modulation wave is picked up around a transmission frequency (e.g., 900 to 940 MHz) of a portable phone, the resultant waveform becomes as shown in FIG. 3A. Smaller waveforms are generated on the right and left sides of FIG. 3A in some cases. Waveforms in the left side in FIG. 3A particularly have a high possibility of influencing a reception frequency (843 to 885 MHz) of the portable phone, as noises. In this case, the communication function essential for a portable phone cannot be retained and there is a concern that a speech function of the portable phone and a read/write function of the IC card are limited to a certain extent.

The present invention has been made in consideration of the above-described problems, and has an issue of providing an IC card capable of suppressing radio waves generated during communications between portable phones and communications between an IC card and a reader/writer from inputting to an IC chip, suppressing radio waves mixedly modulated in the IC chip from outputting, and excluding adverse effects on an operation of peripheral apparatus such as portable phones, and its manufacturing method.

DISCLOSURE OF THE INVENTION

In order to solve the above issue, an IC card of the present invention formed by sandwiching a circuit board on which antenna wiring is formed and an IC chip mounted on the circuit board with a plurality of card constituent sheets, is characterized in that the circuit board is provided with a noise absorber for absorbing and removing noises inputting to and outputting from the IC chip.

An IC card manufacturing method of the present invention includes a step of mounting an IC chip on a circuit board on which antenna wiring is formed, a step of sandwiching the circuit board mounting the IC chip with a plurality of card constituent sheets, and a step of disposing a noise absorber on the circuit board, the noise absorber absorbing and removing noises inputting to and outputting from the IC chip.

By providing the circuit board with the noise absorber for absorbing and removing noises inputting to and outputting from the IC chip, incoming noises are reduced and generation of outgoing noises by mixed modulation waves synthesized in the IC chip are reduced. It is possible to exclude adverse effect on the operation of peripheral communication apparatuses and the like.

The noise absorber is preferably mounted in a wiring area on the circuit board interconnecting the antenna wiring and IC chip. Incoming noises to the IC chip via the antenna wiring can be reduced and outgoing noises to the antenna wiring can be reduced.

The noise absorber may be a chip-type ferrite bead mounted on the circuit board and partially constituting the wiring, magnetic layers formed on the circuit board partially covering the wiring area, or mixed and kneaded magnetic materials with a sealing resin sealing the IC chip on the circuit board.

BEST MODE FOR CARRYING OUT THE INVENTION

In the following, embodiments of the present invention will be described with reference to the drawings.

First Embodiment

Figure 1:
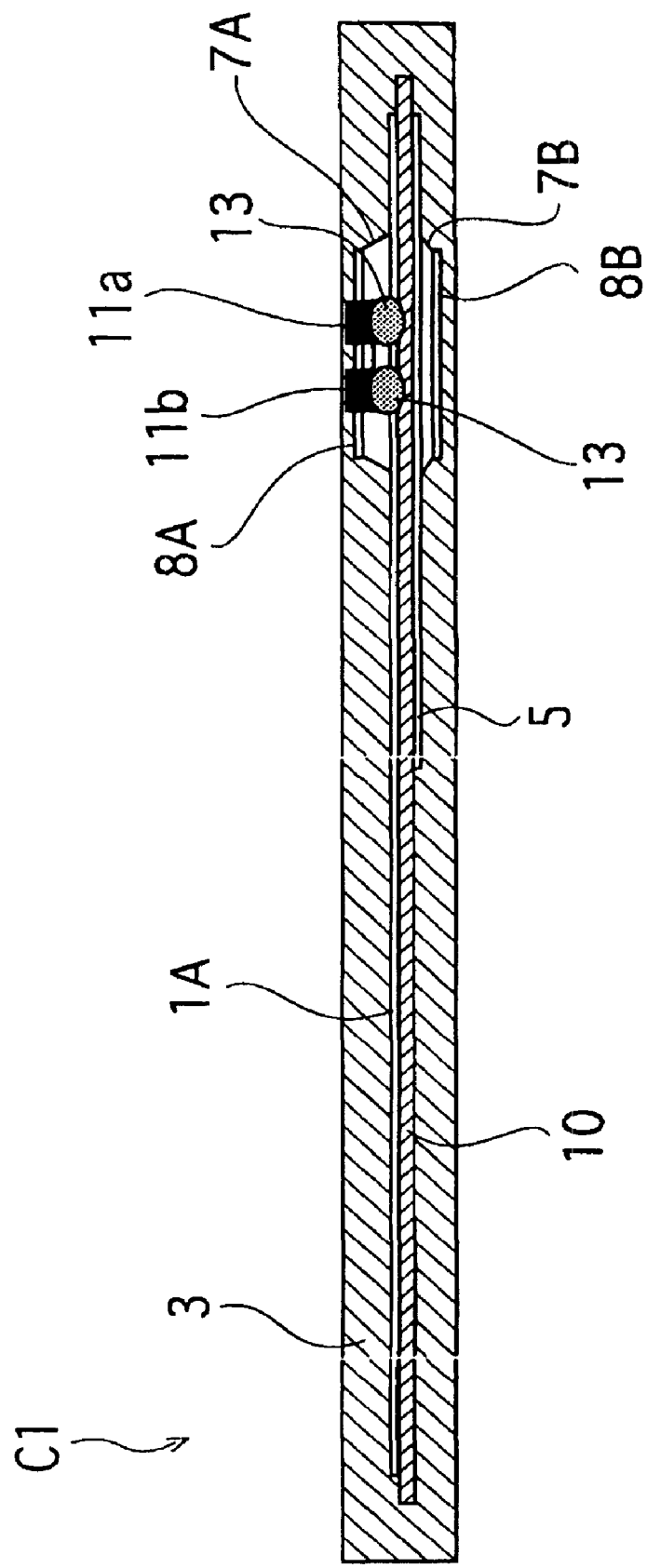
FIG. 1 is a cross sectional side view of an IC card C7 according to a first embodiment of the present invention.
Figure 2:
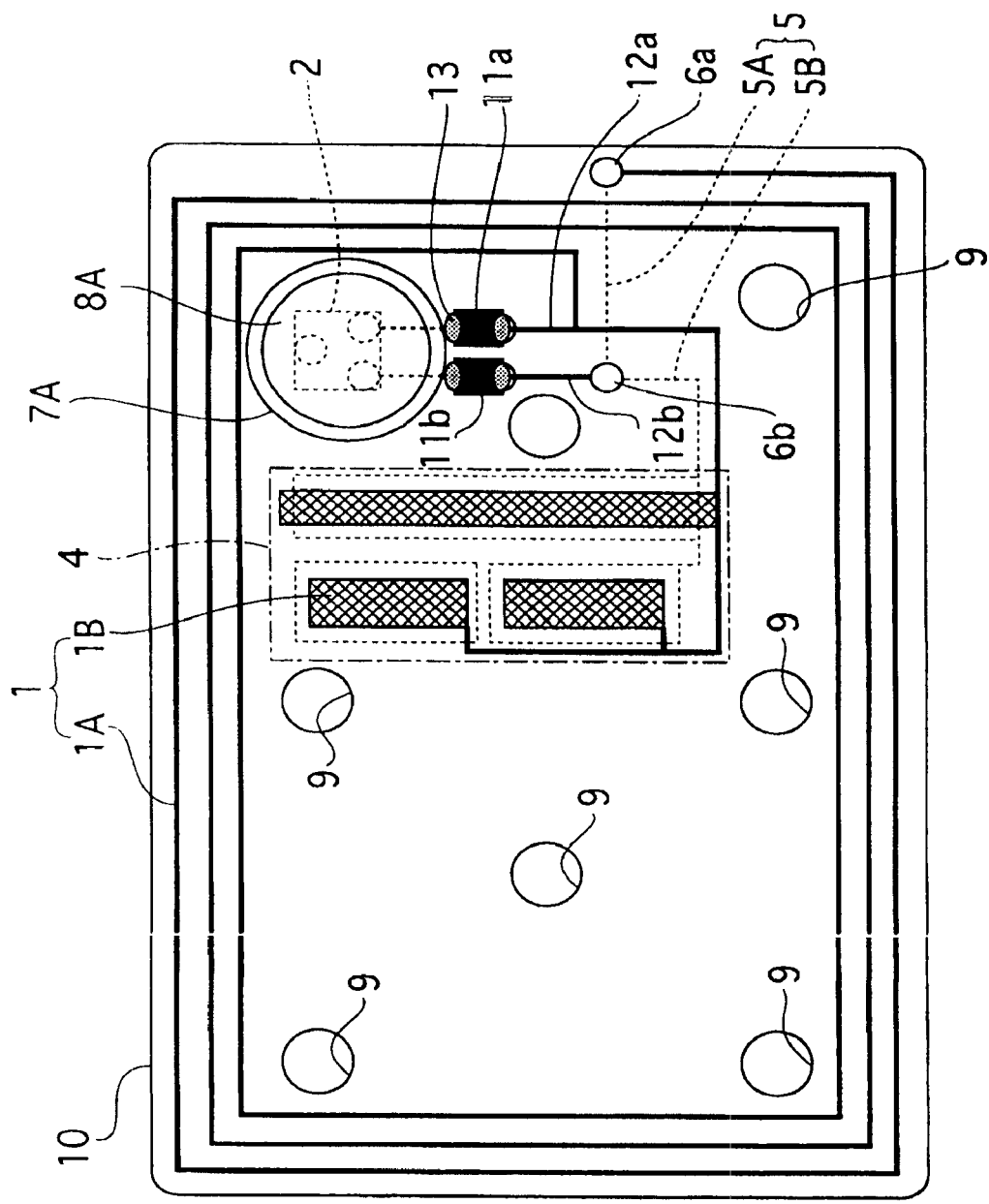
FIG. 2 is a plan view of a circuit board constituting the IC card C7.

FIGS. 1 and 2 illustrate the first embodiment of the present invention. FIG. 1 is a cross sectional side view of an IC card C7 of the first embodiment, and FIG. 2 is a plan view of a circuit board 10 built in the IC card C7.

The IC card C7 is structured in such a manner that the circuit board 10 on which an antenna pattern 1A and an IC chip 2 are formed is built in a card base 3 constituted of a plurality of card constituent sheets thermally pressed and bonded.

As shown in FIG. 2, the circuit board 10 is structured in such a manner that conductive patterns 1 and 5 are formed on the front and back surfaces of an insulating resin film made of polyethylene naphtalate (PEN), polyethylene terephthalate (PET), polyimide (PI) or the like. For example, these conductive patterns 1 and 5 are constructed in such a manner that a metal foil of copper or aluminum formed on the resin film is patterned in predetermined shapes.

The conductive pattern 1 formed on the front surface of the circuit board 10 is constituted of a spiral antenna pattern IA as antenna wiring and an electrode pattern 1B constituting one electrode of a tuning capacitor 4. The conductive pattern 5 formed on the back surface of the circuit board 10 is constituted of a bridge pattern 5A for interconnecting an outer peripheral side of the antenna pattern IA to an inner peripheral side and an electrode pattern 5B constituting the other electrode of the tuning capacitor 4.

The inner peripheral side of the antenna pattern 1.A and the electrode pattern IB are connected to one terminal of the IC chip 2, and the outer peripheral side of the antenna pattern 1A is connected to the bridge pattern 5A via an interlayer interconnect 6a. The bridge pattern 5A and electrode pattern 5B are connected to the other terminal of the IC chip 2 via an interlayer interconnect 6b.

The IC chip 2 is sealed with a sealing resin 7A and a metal reinforcing plate 8A is bonded to the sealing layer to improve the strength of the IC chip. A reinforcing plate 8B is also formed on a chip-unmounted surface (back surface) side of the circuit board 10 in a manner sandwiching the IC chip 2, with a sealing resin 7B being involved.

Figure 5:
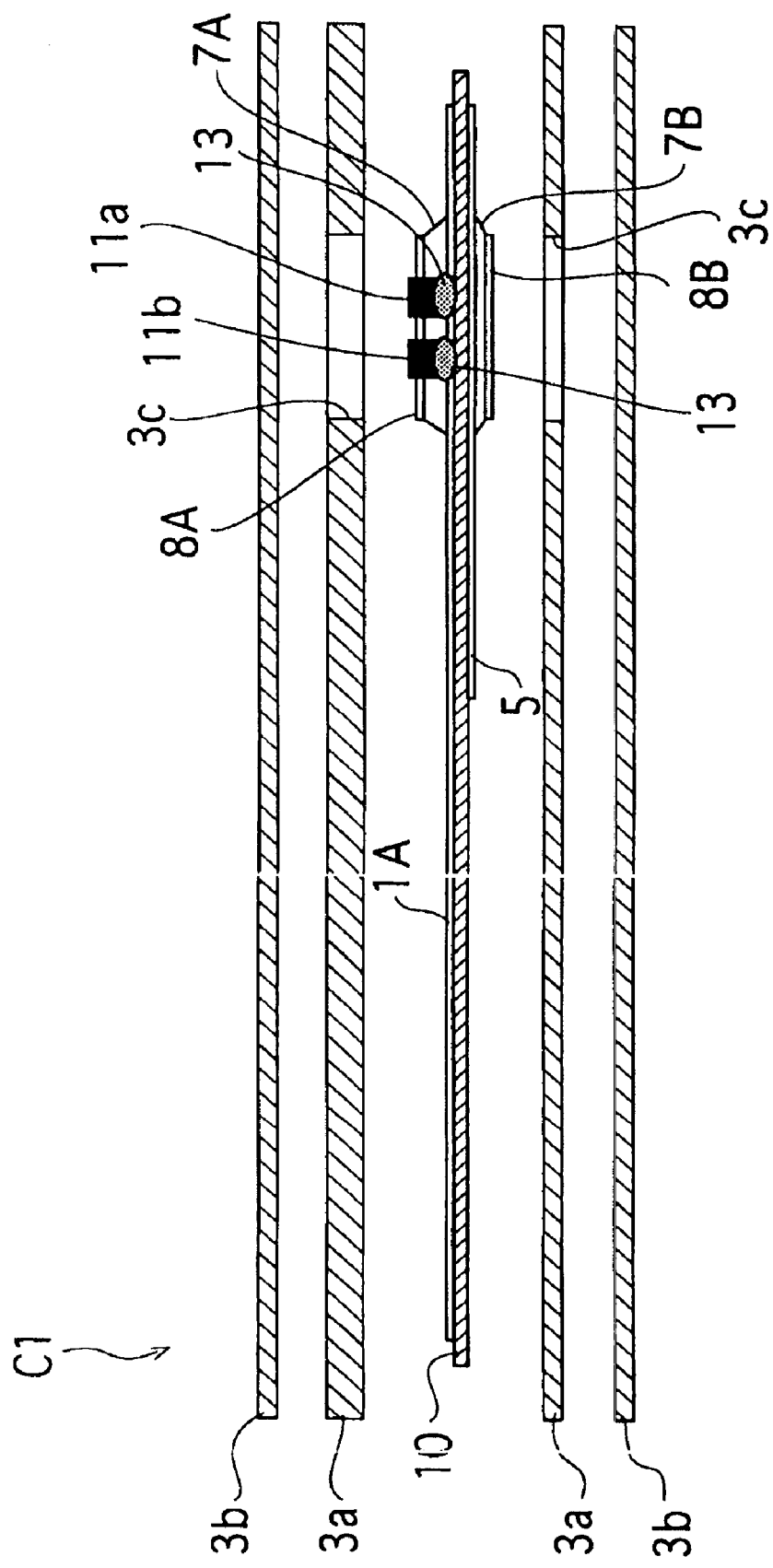
FIG. 5 is an exploded perspective view of the IC card C7.

The card base 3 is structured as shown in FIG. 5 in such a manner that a pair of inner core sheets 3a and 3a and a pair of outer core sheets 3b and 3b respectively sandwiching the circuit substrate 10 are thermally pressed and bonded. The inner core sheet 3a and outer core sheet 3b are made of a thermoplastic resin such as copolymer (PETG) of terephthalic acid, cyclohexane dimethanol and ethylene glycol, and alloy of this copolymer and polycarbonate (PC).

As shown in FIG. 2, through holes 9 are formed through the circuit board 10 at a plurality of positions of the in-plane of the circuit board to improve a flexural-torsion strength of the circuit board 10.

Next, chip-type ferrite beads 11a and 11b are disposed on the circuit board 10. These ferrite beads 11a and 11b correspond to "noise absorbers" of the present invention for absorbing and removing noises inputting to and outputting from the IC chip 2.

The ferrite beads 11a and 11b are mounted on wiring sections 12a and 12b on the circuit board 10 interconnecting the antenna pattern IA and IC chip 2, by using solder 13. The ferrite beads 11a and 11b have a conductive layer partially constituting the wiring sections 12a and 12b and a magnetic layer for absorbing and removing noises (unnecessary radiation energy) inputting to and outputting from the IC chip 2.

A plurality of noises having different frequency bands are input to the IC chip 2, and mixed modulation waves of these noises output from the IC chip. In this embodiment, the ferrite beads 11a and 11b are selected which can absorb and remove noises having frequency components capable of giving adverse effect on the communication operation of peripheral apparatus (e.g., portable phones). The ferrite beads providing these characteristics may be ferrite beads "BLM18BB470SN1" manufactured by Murata Manufacturing Co. Ltd.

In the IC card C7 of this embodiment structured as above, communication radio waves (for example, communication frequency of 13.56 MHz) oscillated from a not shown reader/writer make the antenna pattern generate an induction electromotive force which is supplied as driving voltage for the IC chip 2 to read (or write) information. Speech communications by a portable phone 101 are performed at the same time in some cases.

Noises generated by driving the reader/writer and noises generated by speech communications of the portable phone 101 are absorbed and removed by the chip-type ferrite beads 11a and 11b mounted on the wiring sections 12a and 12b. It is therefore possible to effectively reduce noises outputting from and inputting to the IC chip 2, to prevent external radiation of the noises and to exclude adverse effect on the operation of peripheral communication apparatus.

Figure 3A:
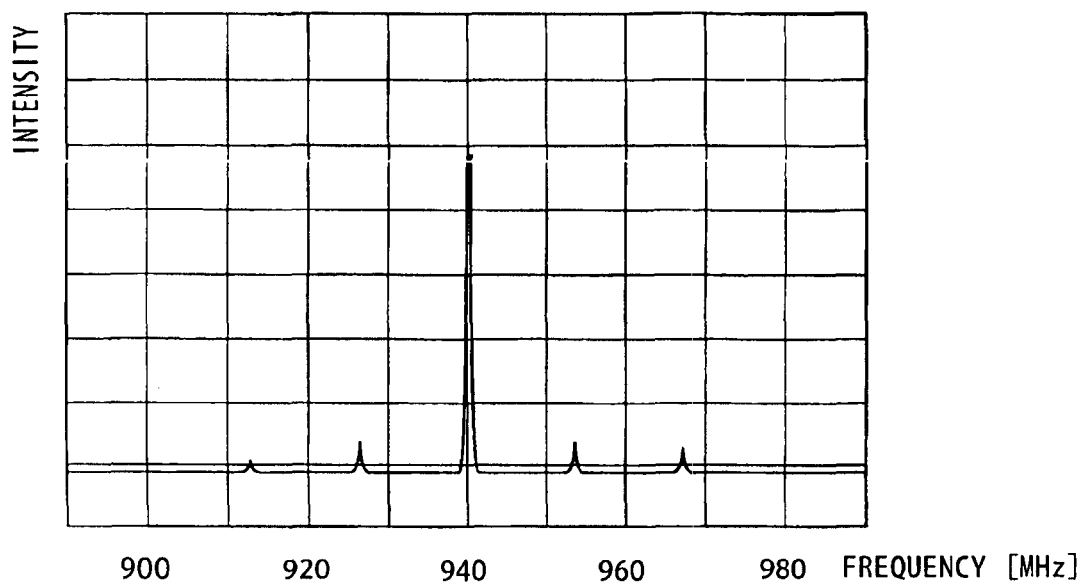
FIGS. 3A and 3B are spectrum analysis diagrams illustrating an operation of the present invention.

FIG. 3A is a spectrum analysis diagram when waveforms by speech communications of a portable phone 101 in the band of a communication frequency of 940 MHz and by communications of the reader/writer are synthesized in the IC chip of the IC card as mixed modulation waveforms which are then output from the IC card. As apparent from FIG. 3A, sideband waves appear at a constant pitch (13.56 MHz) on the high frequency side and low frequency side about the peak at 940 MHz. There is a concern that these sideband waves give adverse effect on the communication operation of a portable phone 101.

Figure 3B:
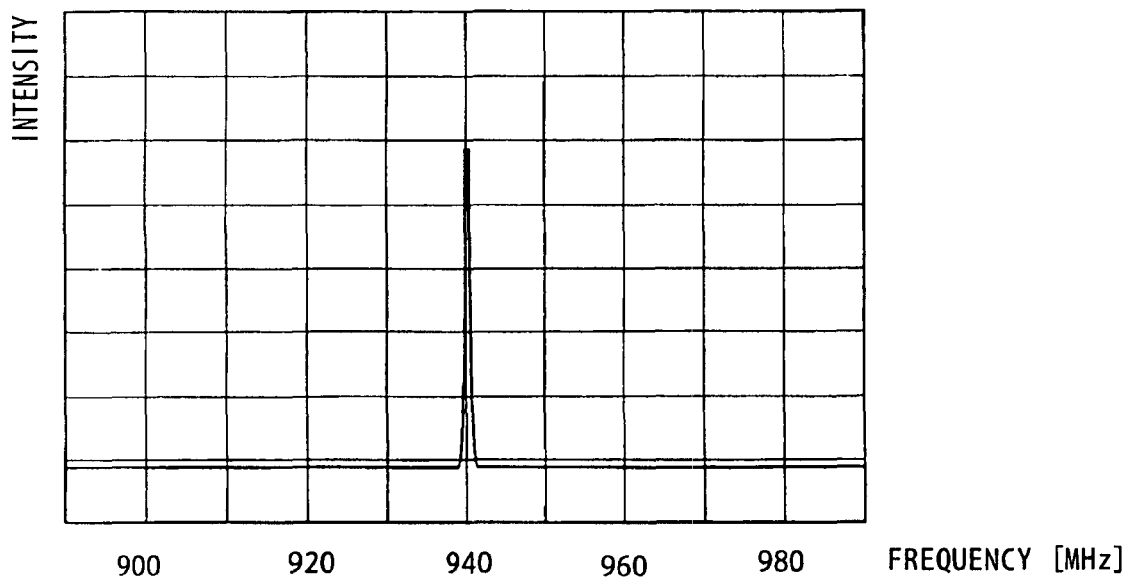

According to the embodiment, as shown in FIG. 3B, noise radiation from the IC chip 2 of the IC card C7 can be suppressed effectively so that the communication characteristics of the portable phone 101 can be stabilized. For example, if the portable phone 101 has an IC card reader/writer built in the terminal main body, it is possible to prevent the communication operation with the IC card C7 from giving adverse effect on the communication operation of the portable phone 101. Electromagnetic interference to an electronic apparatus placed near the IC card C7 can be avoided.

Next, description will be made on a manufacturing method for the IC card of this embodiment structured as above.

Figure 4:
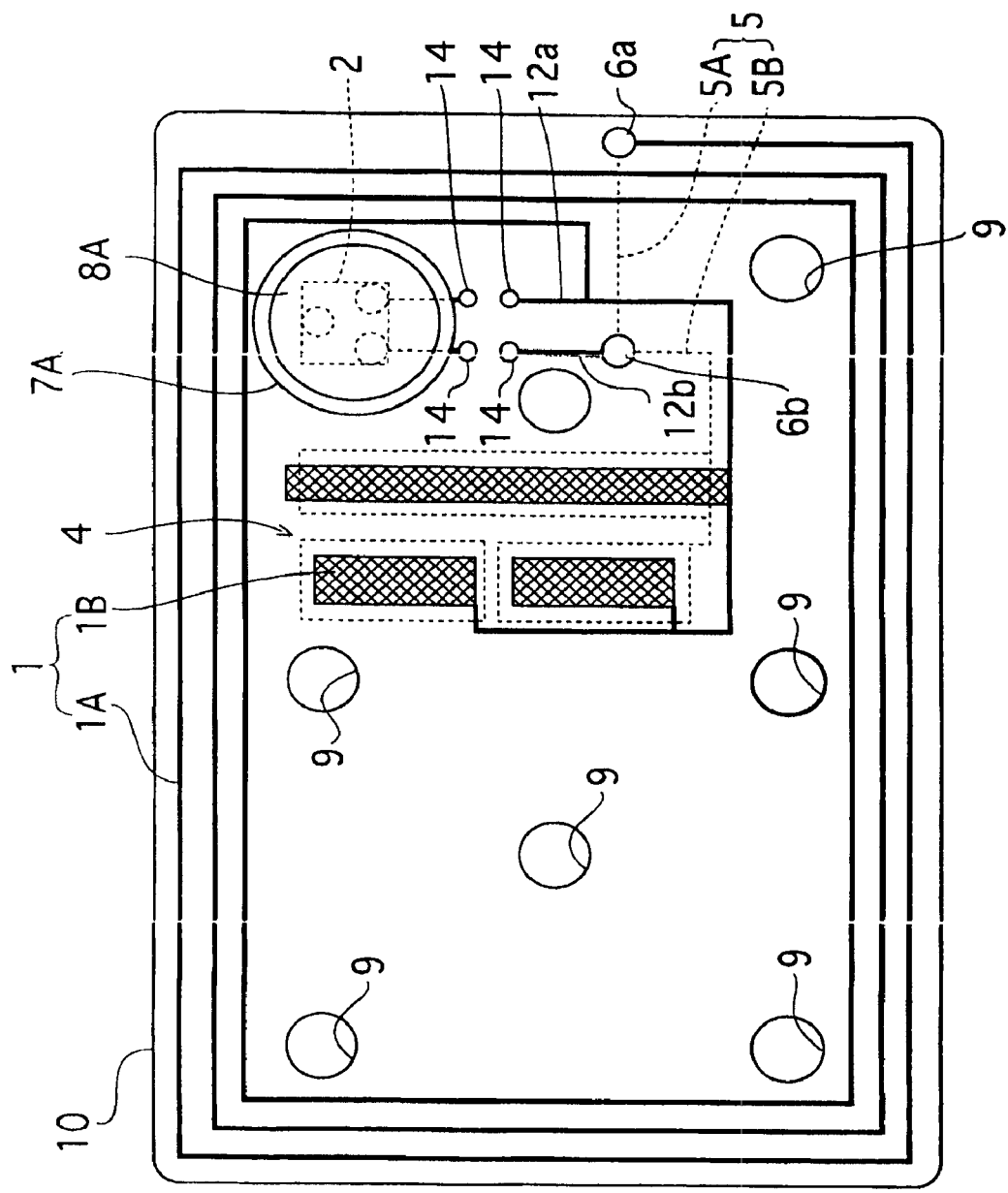
FIG. 4 is a plan view showing the structure of the circuit board 10.

First, as shown in FIG. 4, a process is executed to mount the IC chip 2 on the circuit board 10 on which the conductive patterns 1 and 5 including the antenna pattern 1A are formed. This process of mounting the IC chip 2 executes a process of mounting the IC chip 2 on the circuit board 10, a process of sealing with the sealing resins 7A and 7B and a process of bonding the reinforcing plates 8A and 8B.

Next, a process is executed to mount the ferrite beads 11a and 11b on the circuit board 10 shown in FIG. 4.

In this embodiment, terminals of the ferrite beads 11a and 11b are bonded to lands 14 and 14 (FIG. 4) of the wiring sections 12a and 12b constituting the conductive pattern 1, by using bonding material 13 such as solder (FIG. 2). The mount positions of the ferrite beads 11a and 11b are preferably positions near the IC chip 2. The lands 14 are patterned at the same time when the conductive pattern 1 is formed or continuously formed wiring sections 12a and 12b are cut, for example, by irradiating a laser beam.

Next, a process is executed to laminate the circuit board 10 mounted the ferrite beads 11a and 11b with a plurality of card constituent sheets to form a card.

In this embodiment, as shown in FIG. 5, a pair of inner core sheets 3a and 3a and a pair of outer core sheets 3b and 3b are collated and laminated on the circuit board 10, and the sheets are thermally pressed and bonded under predetermined thermal pressing conditions to form a card. Relief holes 3c and 3c for accommodating an IC mount port are formed in the inner core sheets 3a and 3a so that generation of irregular card surfaces can be suppressed.

According to the embodiment, by providing a process of mounting the ferrite beads 11a and 11b on the circuit board 10, the IC card C7 provided with an unnecessary radiation countermeasure of the present embodiment can be manufactured easily.

Second Embodiment

Figure 6:
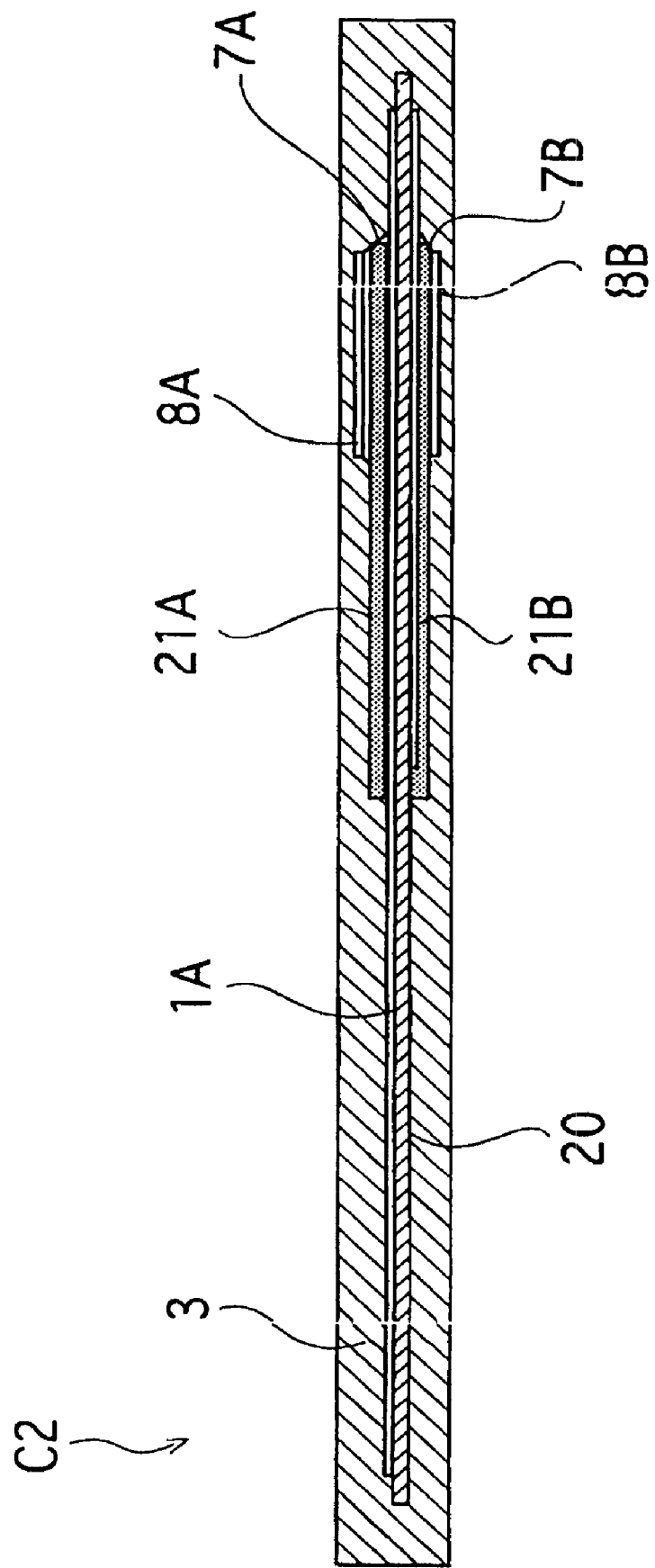
FIG. 6 is a cross sectional side view of an IC card C2 according to a second embodiment of the present invention.
Figure 7:
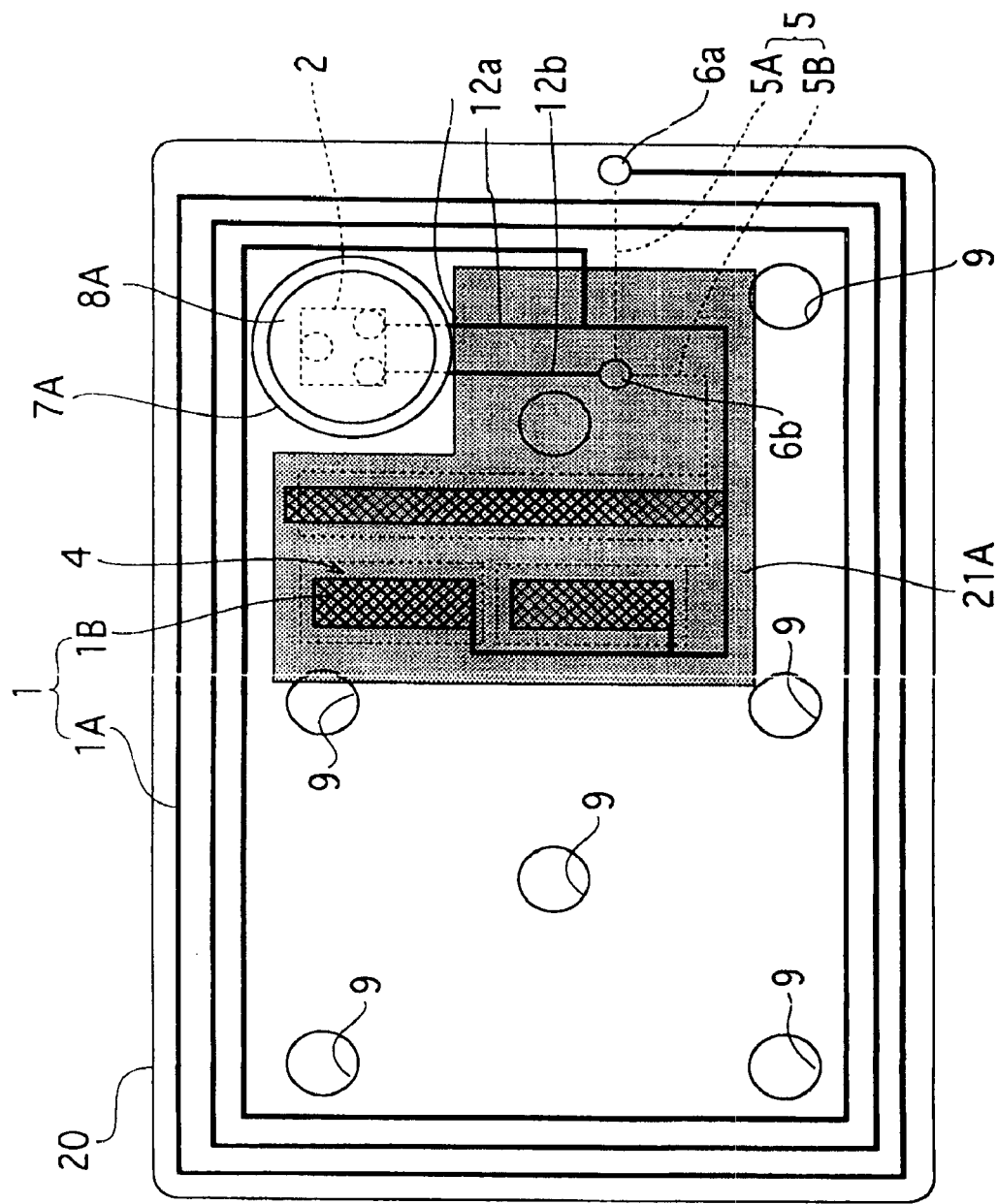
FIG. 7 is a plan view of a circuit board 20 constituting the IC card C2.

FIGS. 6 and 7 show the second embodiment of the present invention. FIG. 6 is a cross sectional side view of an IC card C2 of the embodiment, and FIG. 7 is a plan view of a circuit board 20 constituting the IC card C2. In FIGS. 6 and 7, elements corresponding to those of the first embodiment are represented by using identical reference symbols, and the detailed description thereof is omitted.

In this embodiment, the noise absorbers for absorbing and removing noises inputting to and outputting from the IC chip 2 are constituted of a pair of magnetic layers 21A and 21B covering the electrode patterns 1B and 5B constituting the tuning capacitor 4 and the wiring sections 12a and 12b. For example, the magnetic layers 21A and 21B are structured as the radio wave absorbers made of insulating material such as synthetic resin filled with soft magnetic powders. The magnetic layer 21A is formed on the front surface side of the circuit board 20, and the magnetic layer 21B is formed on the back surface side of the circuit board 20.

Soft magnetic powders may be Sendust (Fe—Al—Si system), Permalloy (Fe—Ni system), amorphous (Fe—Si—Al—B system), ferrite (Ni—Zn ferrite, Mn—Zn ferrite, etc.), sintered ferrite or the like. The magnetic layers 21A and 21B having the above-described structure may be a magnetic sheet processed or formed into a sheet shape, or curable magnetic paste, magnetic compound or the like coated in a layer shape.

The magnetic layers 21A and 21B perform an operation of absorbing and removing noises inputting to and outputting from the IC chip 2 of the IC card C2. In this embodiment, almost all of the wiring area excepting the antenna pattern 1A is covered with the magnetic layers 21A and 21B to improve the noise absorption efficiency. The area where the magnetic layers 21A and 21B are formed is not limited thereto, but it is sufficient if the magnetic layers are formed at least in the area of the wiring sections 12a and 12b interconnecting the antenna pattern 1A and IC chip 2.

In manufacturing the IC card C2 constructed as above, after the IC chip 2 is mounted on the circuit board 20, the magnetic layers 21A and 21B are disposed on the front and back surfaces of the circuit board 20. Similar to the first embodiment described above, the circuit board 20 is sandwiched by a plurality of card constituent sheets constituted of a pair of inner core sheets and a pair of outer core sheets and by performing thermal pressing to form a card.

Relief holes are formed in the inner core sheets on the inner side to accommodate the magnetic layers 21A and 21B so that an amount of irregularity on the card surfaces after the sheets are laminated can be reduced and a card thickness can be made thin.

If the magnetic layers 21A and 21B are to be made of magnetic paste, after the magnetic paste is coated, the magnetic paste is subjected to the curing process, for example, together with the sealing resins 7A and 7B sealing the IC chip 2. If the magnetic layers 2IA and 21B are to be made of magnetic compound, after the magnetic compound is coated, the magnetic compound is cured at the same time when thermal pressing to form a card is performed.

According to the IC card C2 of the embodiment, similar to the first embodiment, noises from the IC chip 2 generated during card communications can be removed to exclude adverse effect on the operation of peripheral apparatus. It is also possible to exclude magnetic interference to electronic apparatuses placed near the IC card C2.

According to the embodiment, as compared to the first embodiment, a process of soldering or the like is not necessary. Therefore, a manufacture cost can be reduced, card manufacture can be made efficient, the product quality can be stabilized, correspondingly.

Third Embodiment

Figure 8:
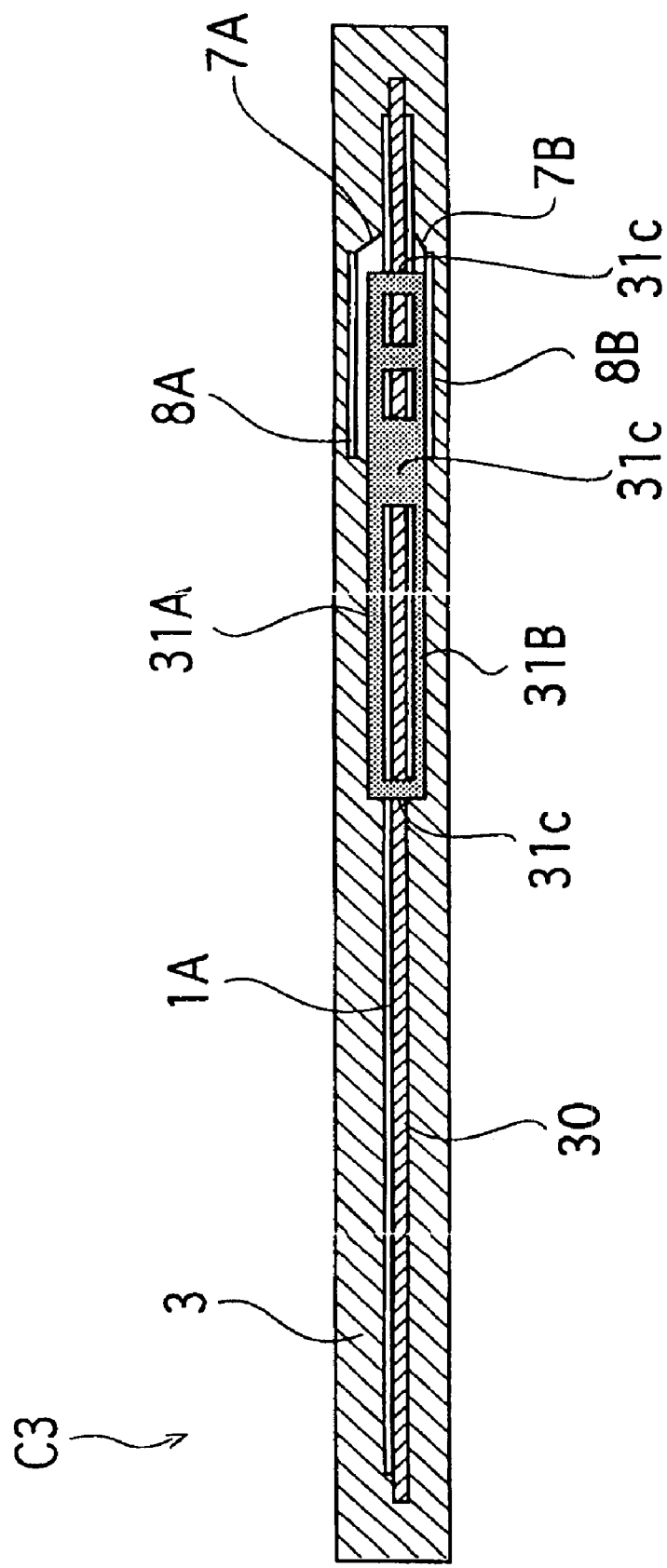
FIG. 8 is a cross sectional side view of an IC card C3 according to a third embodiment of the present invention.
Figure 9:
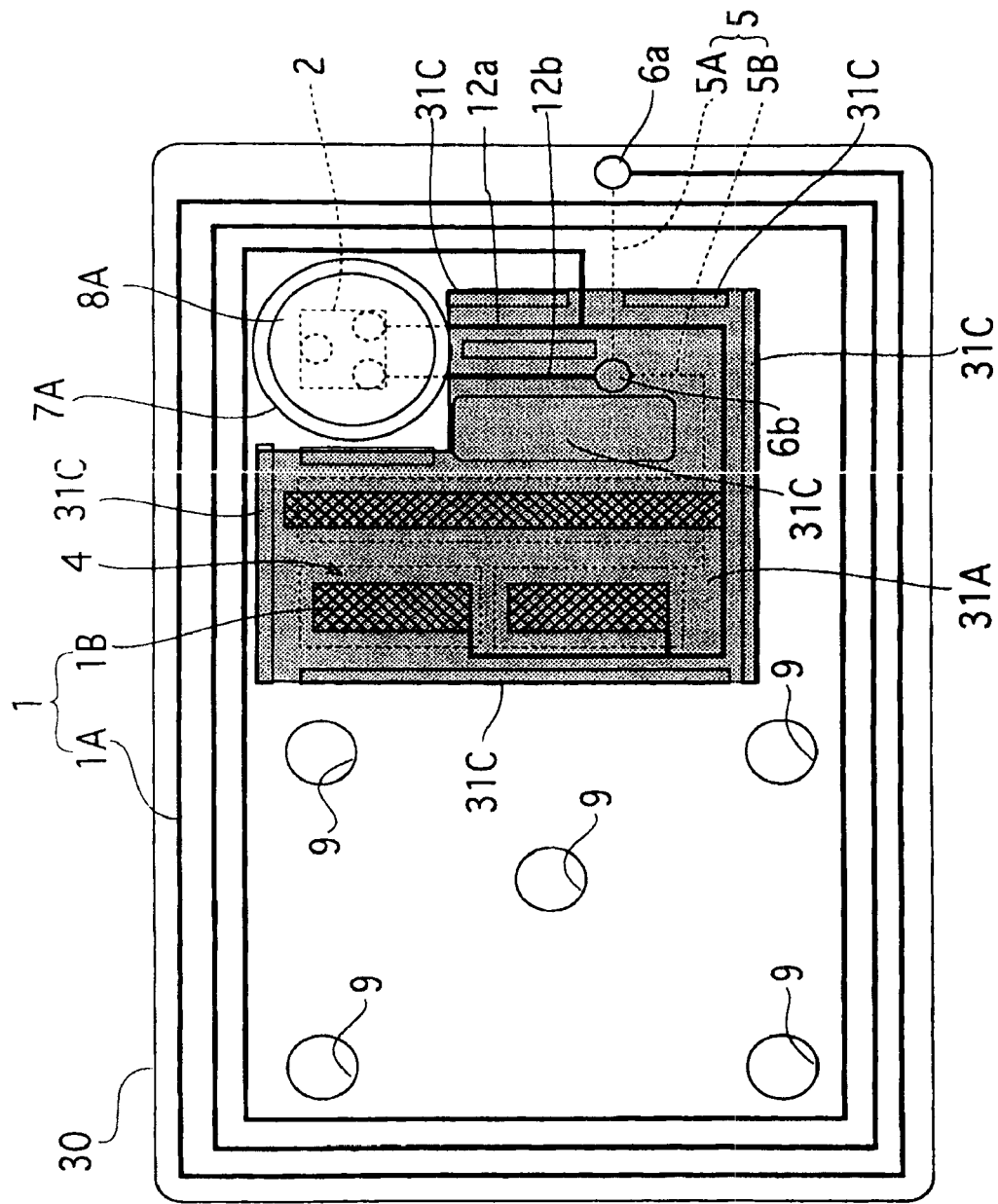
FIG. 9 is a plan view of a circuit board 30 constituting the IC card C3.
Figure 10:
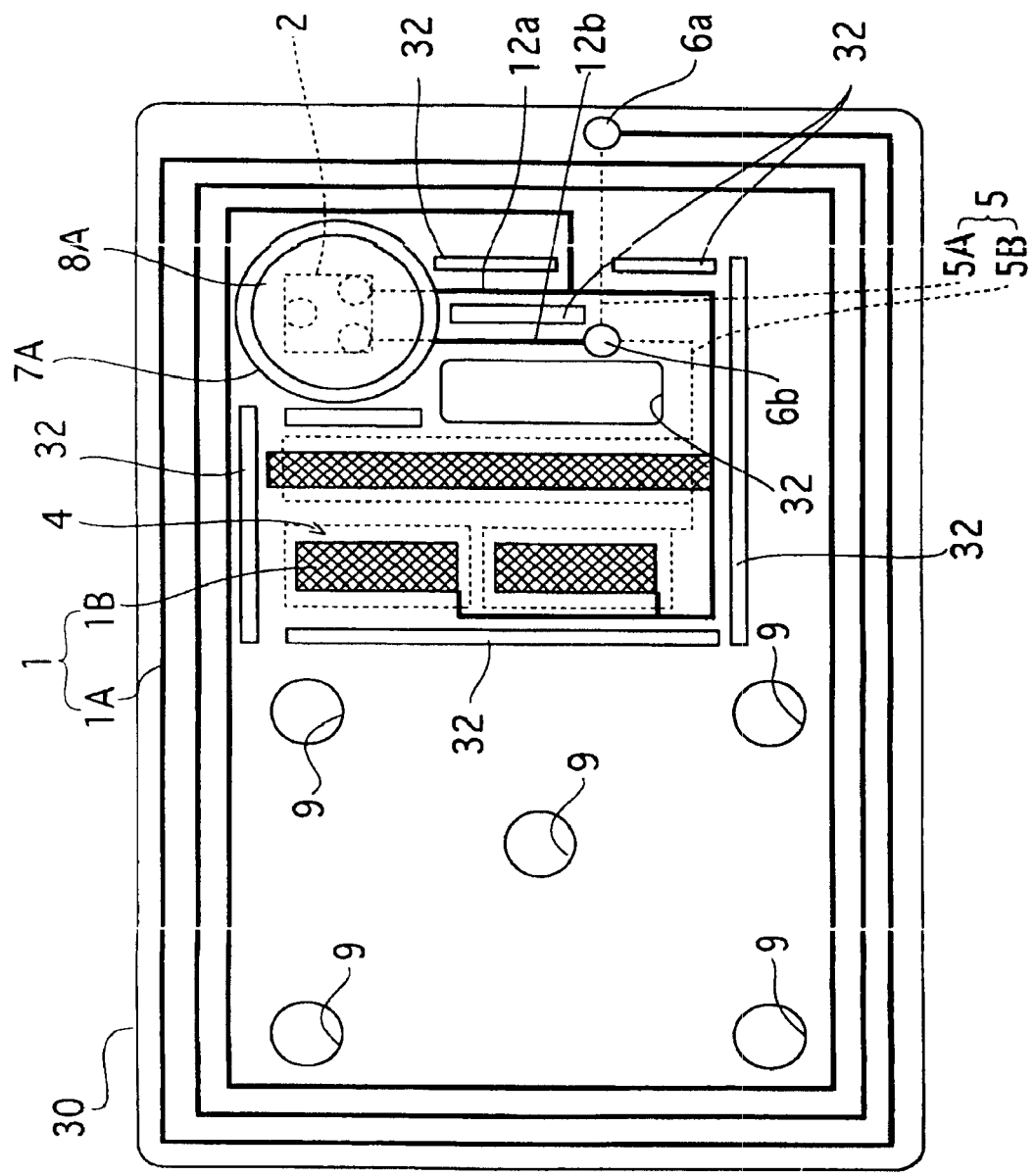
FIG. 10 is a plan view showing the structure of the circuit board 30.

FIGS. 8 to 10 show the third embodiment of the present invention. FIG. 8 is a cross sectional side view of an IC card C3 of the embodiment, FIG. 9 is a plan view of a circuit board 30 constituting the IC card C3, and FIG. 10 is a plan view showing the structure of the circuit board 30. In FIGS. 8 to 10, elements corresponding to those of the first embodiment are represented by using identical reference symbols, and the detailed description thereof is omitted.

In this embodiment, the noise absorbers for absorbing and removing noises inputting to and outputting from the IC chip 2 are constituted of a pair of magnetic layers 31A and 31B covering the electrode patterns 1B and 5B constituting the tuning capacitor 4 and the wiring sections 12a and 12b. Similar to the magnetic layers 21A and 21B of the above-described second embodiment, the magnetic layers 31A and 31B are structured as the radio wave absorbers made of insulating material such as synthetic resin filled with soft magnetic powders.

The magnetic layer 31A is formed on the front surface side of the circuit board 30, and the magnetic layer 31B is formed on the back surface side of the circuit board 30. The magnetic layers 31A and 31B are coupled together by a plurality of bridge sections 31C passing through the circuit board 30.

The magnetic layers 31A and 31B having the above-described structure may be a magnetic sheet processed or formed into a sheet shape, however, it is preferable to use curable magnetic paste, magnetic compound or the like coated in a layer shape.

The magnetic layers 31A and 31B perform an operation of absorbing and removing noises inputting to and outputting from the IC chip 2 of the IC card C3. In this embodiment, almost all of the wiring area excepting the antenna pattern 1A is surrounded by the magnetic layers 31A and 31B and bridge sections 31C to improve the noise absorption efficiency.

In manufacturing the IC card C3 constructed as above, through holes 32 for forming the bridge sections 31C are formed through the circuit board 30. In this case, it is preferable to form the through holes 32 in such a manner that the magnetic layers 31A and 31B can surround the conductive patterns 1 and 5 excepting the antenna pattern 1A.

After the IC chip 2 is mounted on the circuit board 30, the magnetic layers 31A and 31B are disposed on the front and back surfaces of the circuit board 30. The magnetic layers are formed filling the insides of the through holes 32. Similar to the first embodiment described above, the circuit board 30 is sandwiched by a plurality of card constituent sheets constituted of a pair of inner core sheets and a pair of outer core sheets and by performing thermal pressing to form a card.

Relief holes are formed in the inner core sheets on the inner side to accommodate the magnetic layers 31A and 31B so that an amount of irregularity on the card surfaces after the sheets are laminated can be reduced and a card thickness can be made thin.

If the magnetic layers 31A and 31B are to be made of magnetic paste, after the magnetic paste is coated, the magnetic paste is subjected to the curing process, for example, together with the sealing resins 7A and 7B sealing the IC chip 2. If the magnetic layers 31A and 31B are to be made of magnetic compound, after the magnetic compound is coated, the magnetic compound is cured at the same time when thermal pressing to form a card is performed.

According to the IC card C3 of the embodiment, similar to the first embodiment, noises inputting to and outputting from the IC chip 2 can be removed to exclude adverse effect on the operation of peripheral apparatus. It is also possible to exclude magnetic interference to electronic apparatuses placed near the IC card C3.

According to the embodiment, as compared to the first embodiment, a process of soldering or the like is not necessary. Therefore, a manufacture cost can be reduced, card manufacture can be made efficient, the product quality can be stabilized, correspondingly.

Fourth Embodiment

Figure 11:
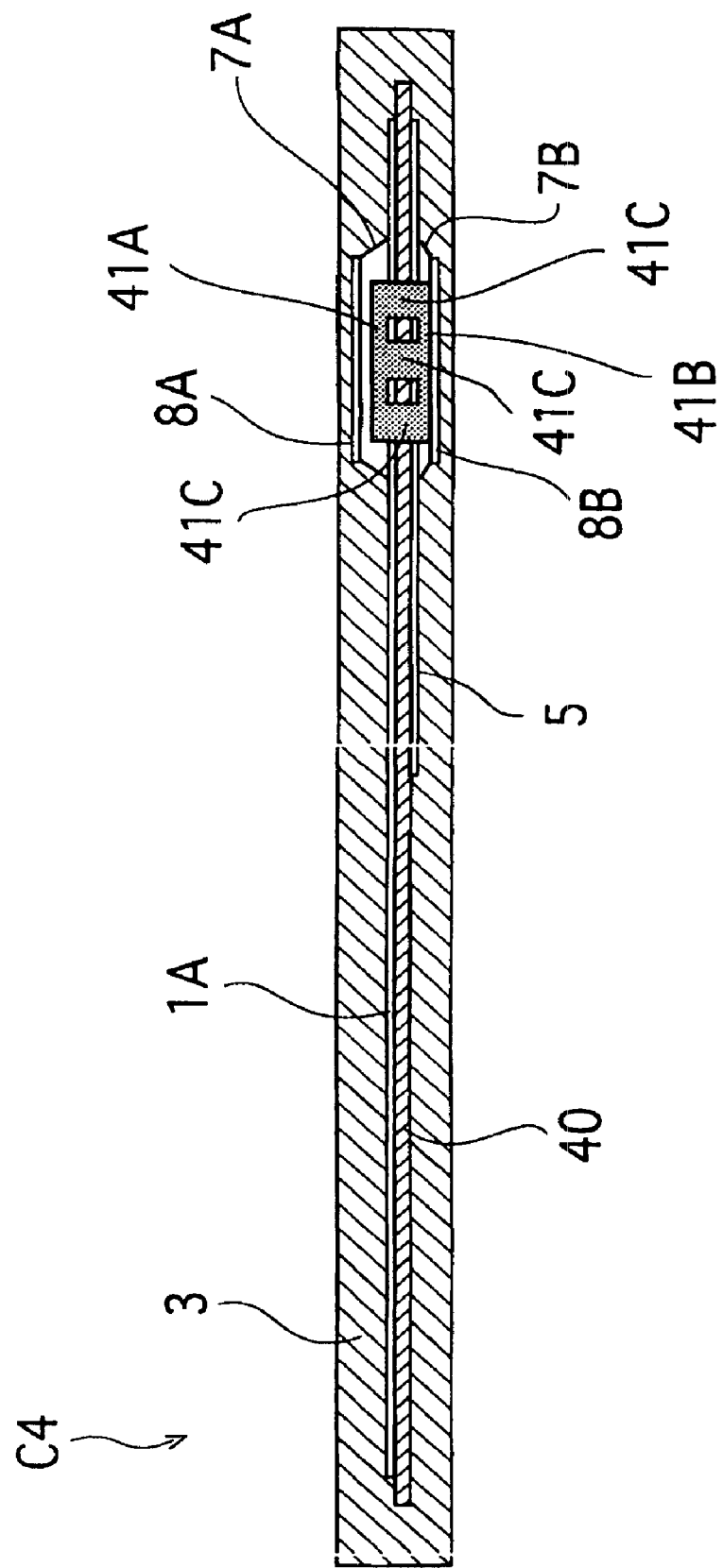
FIG. 11 is a cross sectional side view of an IC card C4 according to a fourth embodiment of the present invention.
Figure 12:
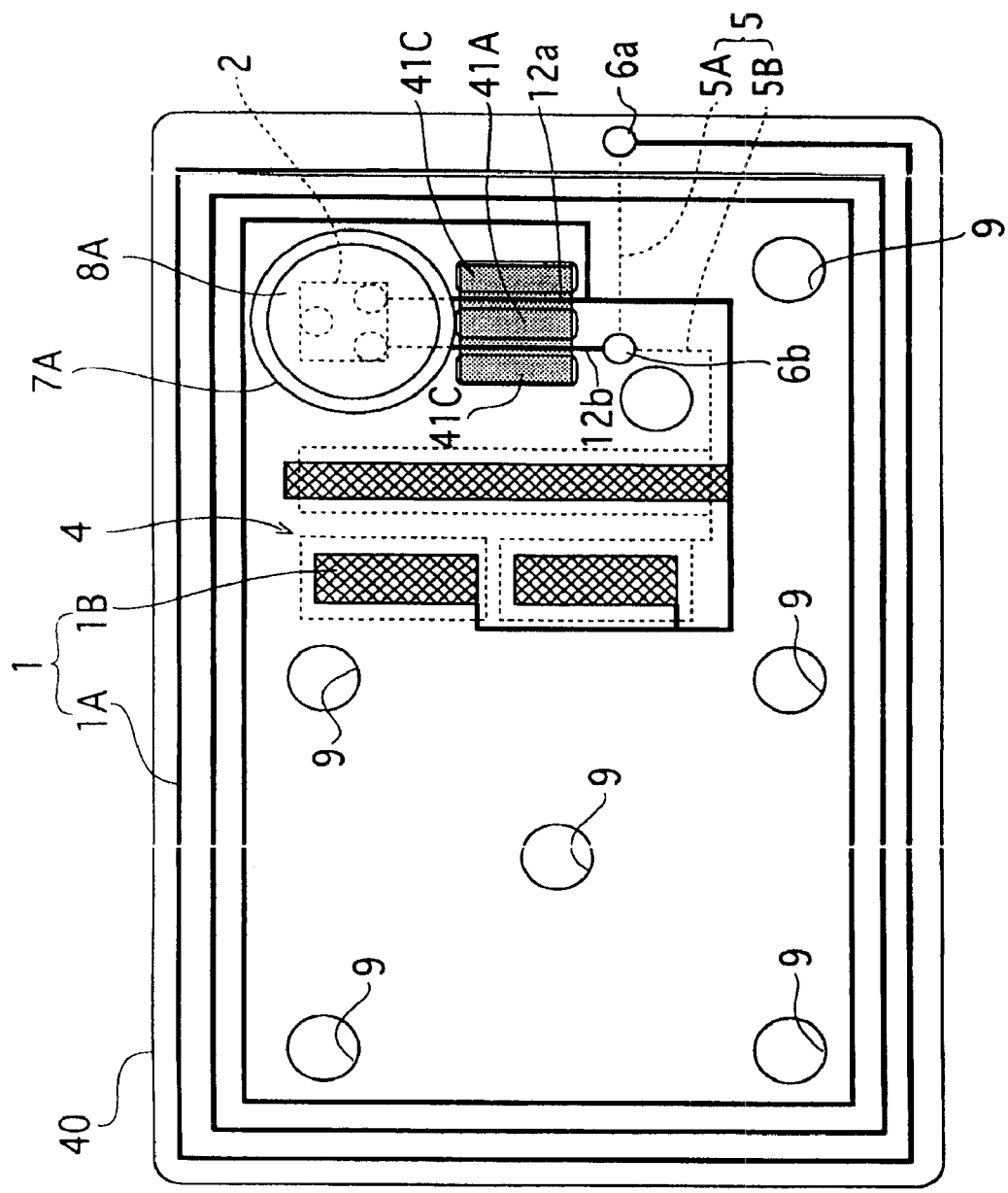
FIG. 12 is a plan view of a circuit board 40 constituting the IC card C4.
Figure 13:
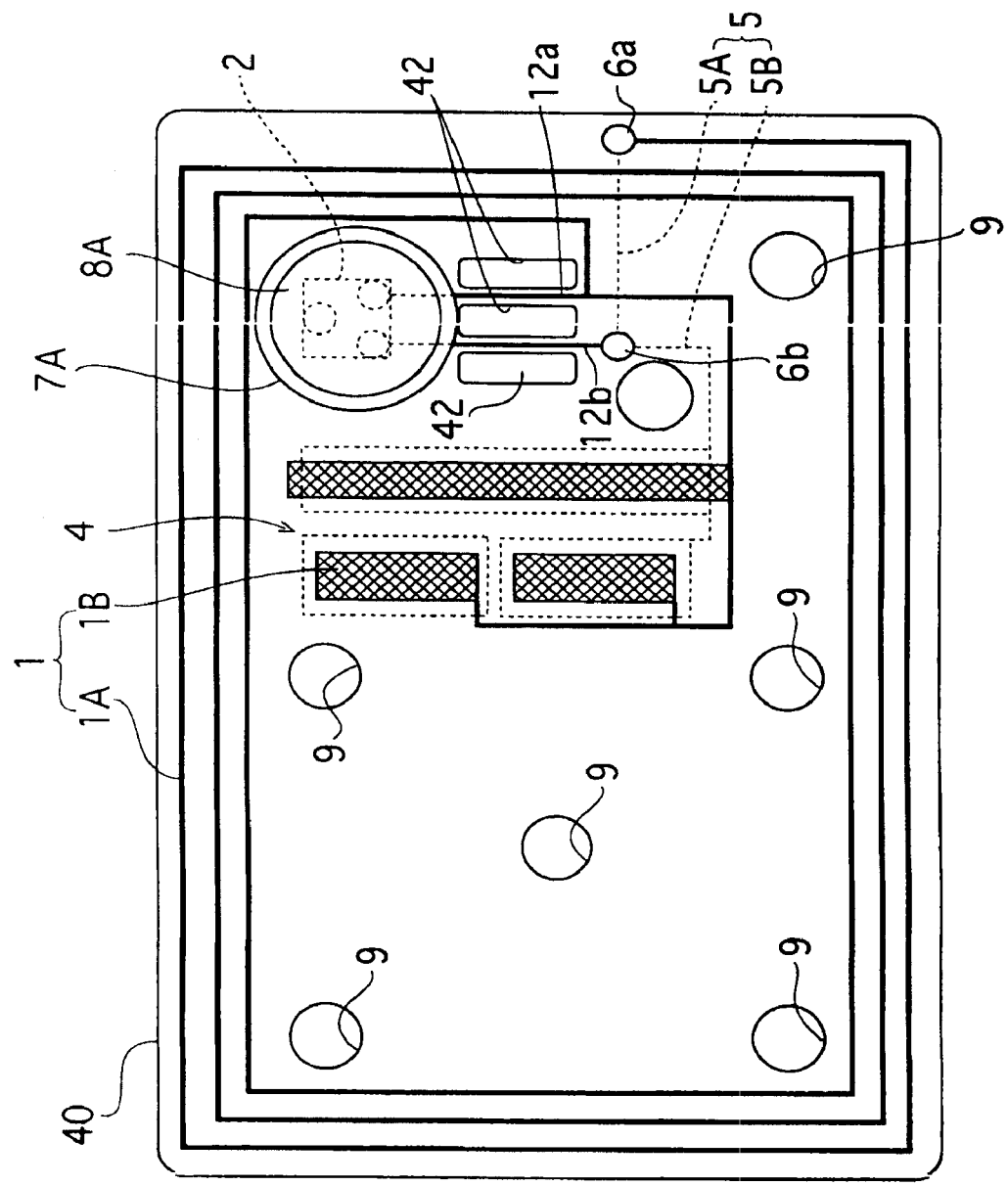
FIG. 13 is a plan view showing the structure of the circuit board 40.

FIGS. 11 to 13 show the fourth embodiment of the present invention. FIG. 11 is a cross sectional side view of an IC card C4 of the embodiment, FIG. 12 is a plan view of a circuit board 40 constituting the IC card C4, and FIG. 13 is a plan view showing the structure of the circuit board 40. In FIGS. 11 to 13, elements corresponding to those of the first embodiment are represented by using identical reference symbols, and the detailed description thereof is omitted.

In this embodiment, the noise absorbers for absorbing and removing noises inputting to and outputting from the IC chip 2 are constituted of a pair of magnetic layers 41A and 41B covering the wiring sections 12a and 12b. Similar to the magnetic layers 21A and 21B of the above-described second embodiment, the magnetic layers 41A and 41B are structured as the radio wave absorbers made of insulating material such as synthetic resin filled with soft magnetic powders.

The magnetic layer 41A is formed on the front surface side of the circuit board 40, and the magnetic layer 31B is formed on the back surface side of the circuit board 40. The magnetic layers 31A and 31B are coupled together by a plurality of bridge sections 41C passing through the circuit board 40.

The magnetic layers 41A and 41B having the above-described structure may be a magnetic sheet processed or formed into a sheet shape, or are preferably curable magnetic paste, magnetic compound or the like coated in a layer shape.

The magnetic layers 41A and 41B perform an operation of absorbing and removing noises inputting to and outputting from the IC chip 2 of the IC card C4. In this embodiment, the wiring sections 12a and 12b interconnecting the antenna pattern IA and IC chip 2 are surrounded by the magnetic layers 31A and 31B and bridge sections 31C to improve the noise absorption efficiency.

In manufacturing the IC card C4 constructed as above, through holes 42 for forming the bridge sections 41C are formed through the circuit board 40. In this case, the through holes 42 are formed in such a manner that the magnetic layers 41A and 41B can surround the wiring sections 12a and 12b. It is preferable that the magnetic layers 41A and 41B are disposed near the IC chip 2.

After the IC chip 2 is mounted on the circuit board 40, the magnetic layers 41A and 41B are disposed on the front and back surfaces of the circuit board 40. The magnetic layers are formed filling the insides of the through holes 42. Similar to the first embodiment described above, the circuit board 40 is sandwiched by a plurality of card constituent sheets constituted of a pair of inner core sheets and a pair of outer core sheets and by performing thermal pressing to form a card.

Relief holes are formed in the inner core sheets on the inner side to accommodate the magnetic layers 41A and 41B so that an amount of irregularity on the card surfaces after the sheets are laminated can be reduced and a card thickness can be made thin.

If the magnetic layers 41A and 41B are to be made of magnetic paste, after the magnetic paste is coated, the magnetic paste is subjected to the curing process, for example, together with the sealing resins 7A and 7B sealing the IC chip 2. If the magnetic layers 41A and 41B are to be made of magnetic compound, after the magnetic compound is coated, the magnetic compound is cured at the same time when thermal pressing to form a card is performed.

According to the IC card C4 of the embodiment, similar to the first embodiment, noises inputting to and outputting from the IC chip 2 can be removed to exclude adverse effect on the operation of peripheral apparatus. It is also possible to exclude magnetic interference to electronic apparatuses placed near the IC card C9.

According to the embodiment, as compared to the first embodiment, a process of soldering or the like is not necessary. Therefore, a manufacture cost can be reduced, card manufacture can be made efficient, the product quality can be stabilized, correspondingly.

Fifth Embodiment

Figure 14:
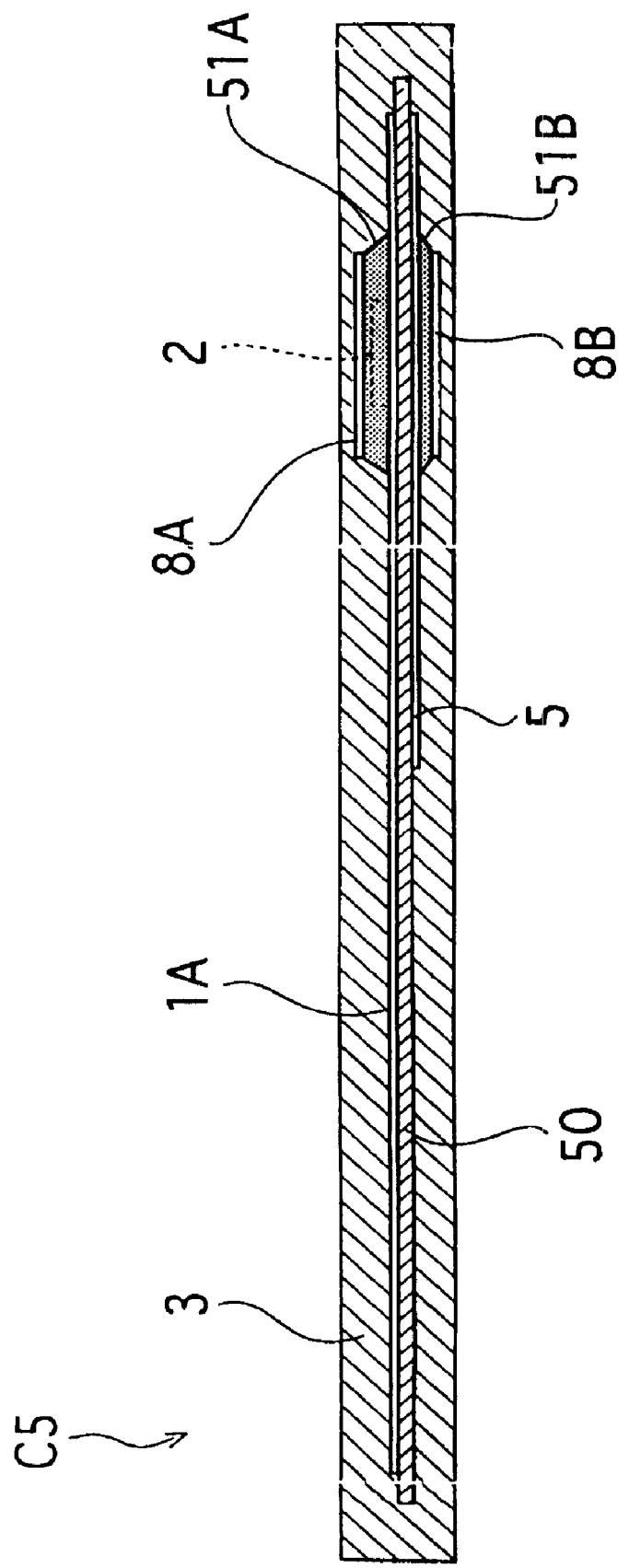
FIG. 14 is a cross sectional side view of an IC card C5 according to a fifth embodiment of the present invention.
Figure 15:
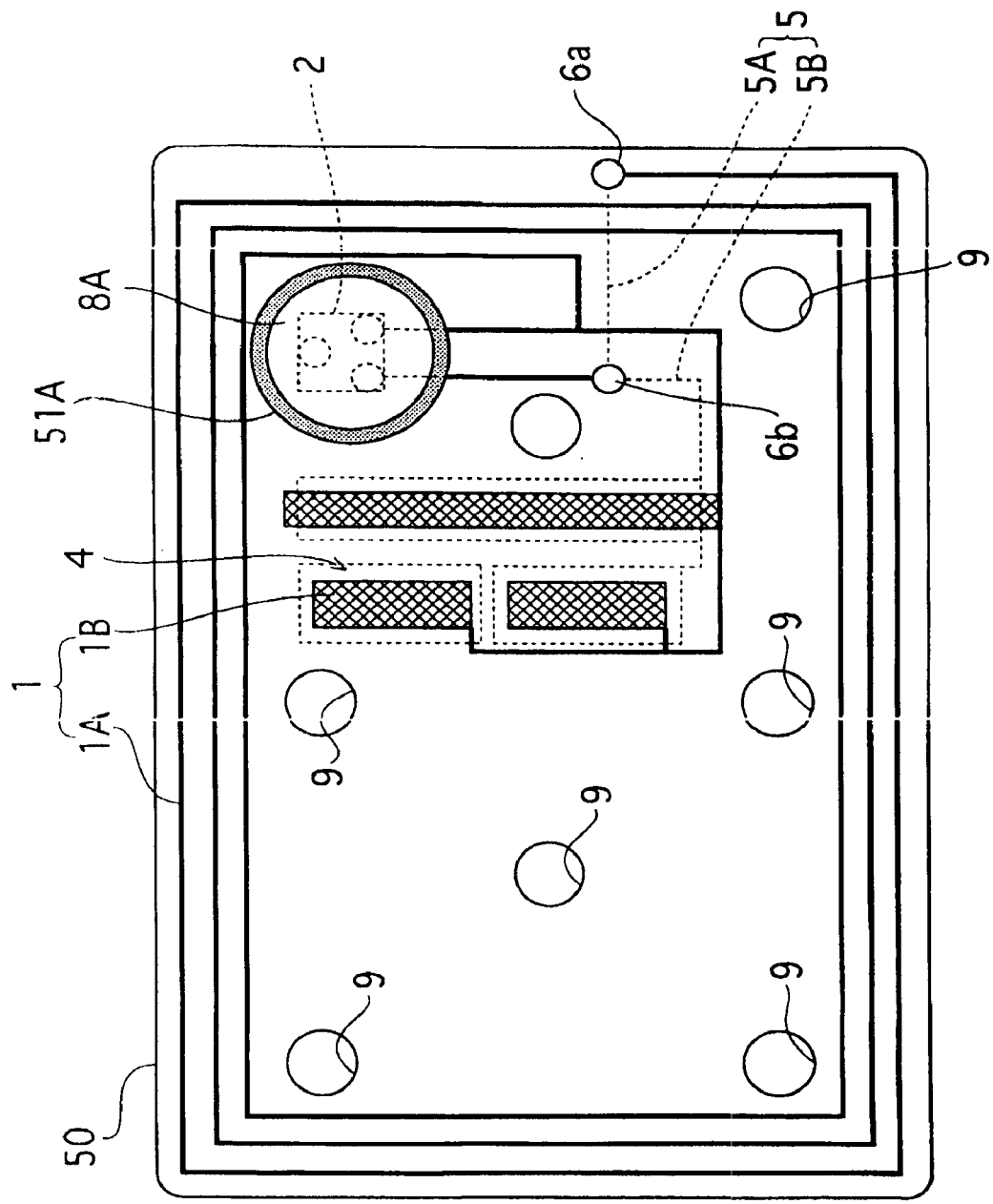
FIG. 15 is a plan view of a circuit board 50 constituting the IC card C5.

FIGS. 14 and 15 show the fifth embodiment of the present invention. FIG. 14 is a cross sectional side view of an IC card C5 of the embodiment, and FIG. 15 is a plan view of a circuit board 50 constituting the IC card C5. In FIGS. 14 and 15, elements corresponding to those of the first embodiment are represented by using identical reference symbols, and the detailed description thereof is omitted.

In this embodiment, the noise absorbers for absorbing and removing noises inputting to and outputting from the IC chip 2 are constituted of sealing resins 51A and 51B sealing the IC chip 2. The sealing resins 51A and 51B are structured as the radio wave absorbers made of insulating material such as synthetic resin filled with soft magnetic powders.

In this embodiment, although the sealing resins 51A and 51B are structured as the noise absorbers, the sealing resin 51B on the back surface side of the chip may be made of usual (non-magnetic) sealing material, if necessary.

The sealing resins 51A and 51B perform an operation of absorbing and removing noises inputting to and outputting from the IC chip 2 of the IC card C5. In this embodiment, the sealing material for sealing the IC chip 2 is made of material having a radio wave absorption property to obtain a noise absorbing and removing effect. Therefore, noises inputting to and outputting from the IC chip 2 can be removed to exclude adverse effect on the operation of peripheral apparatus. It is also possible to exclude magnetic interference to electronic apparatuses placed near the IC card C5.

In manufacturing the IC card C5 constructed as above, chip sealing material is replaced with the sealing resins 51A and 51B having the above-described radio wave absorption property, and conventional IC card manufacture processes can be used without change.

Sixth Embodiment

Figure 16:
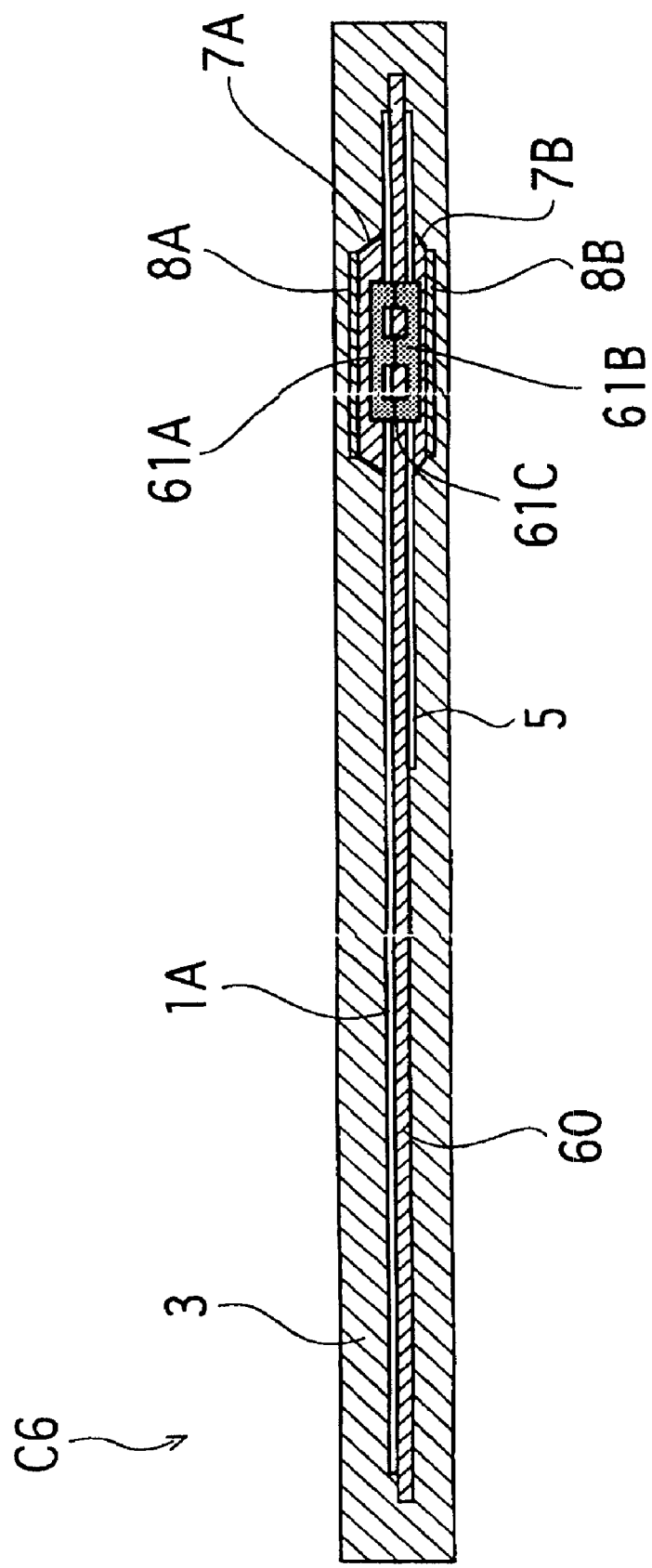
FIG. 16 is a cross sectional side view of an IC card C6 according to a sixth embodiment of the present invention.
Figure 17:
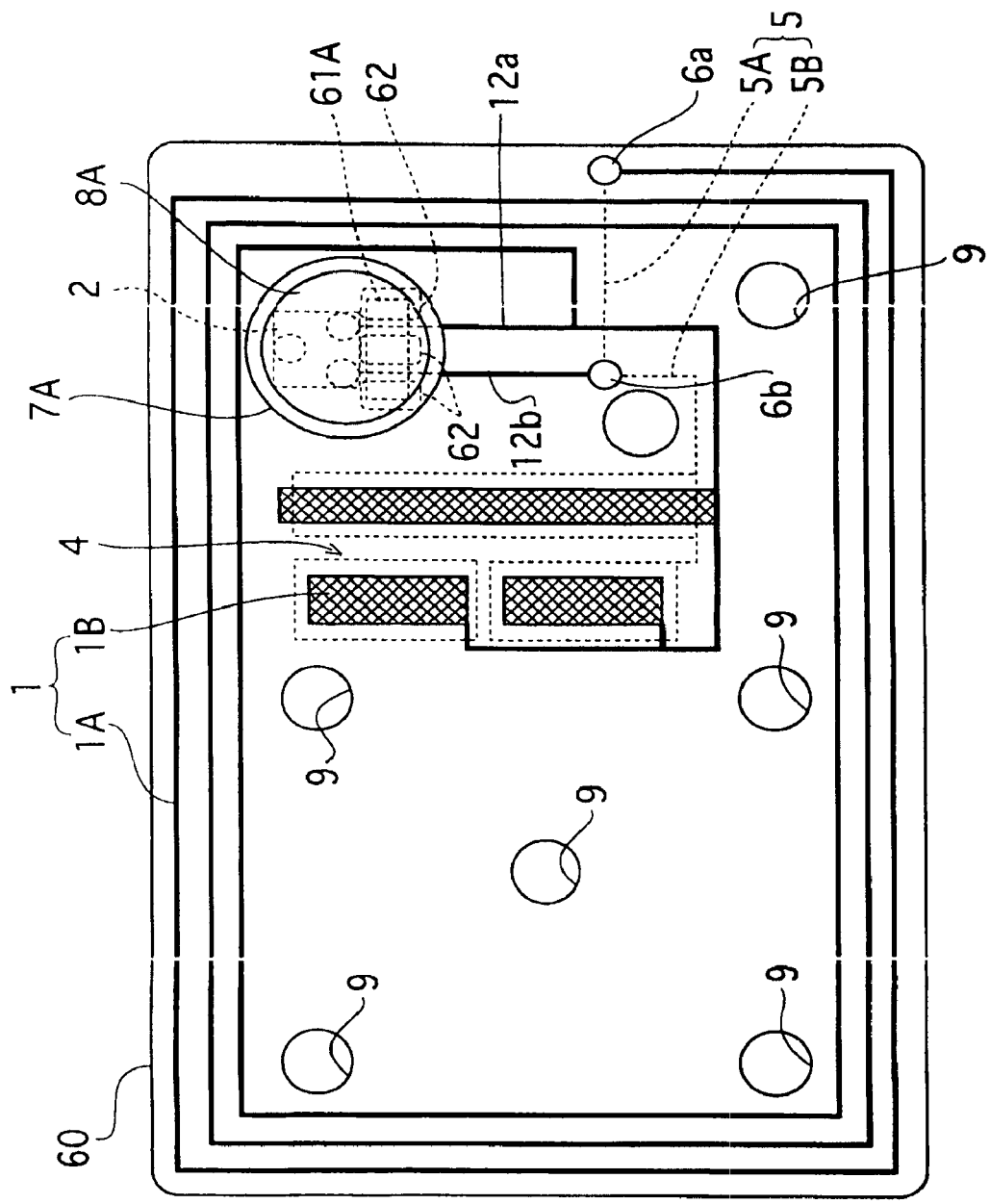
FIG. 17 is a plan view of a circuit board 60 constituting the IC card C6.
Figure 18:
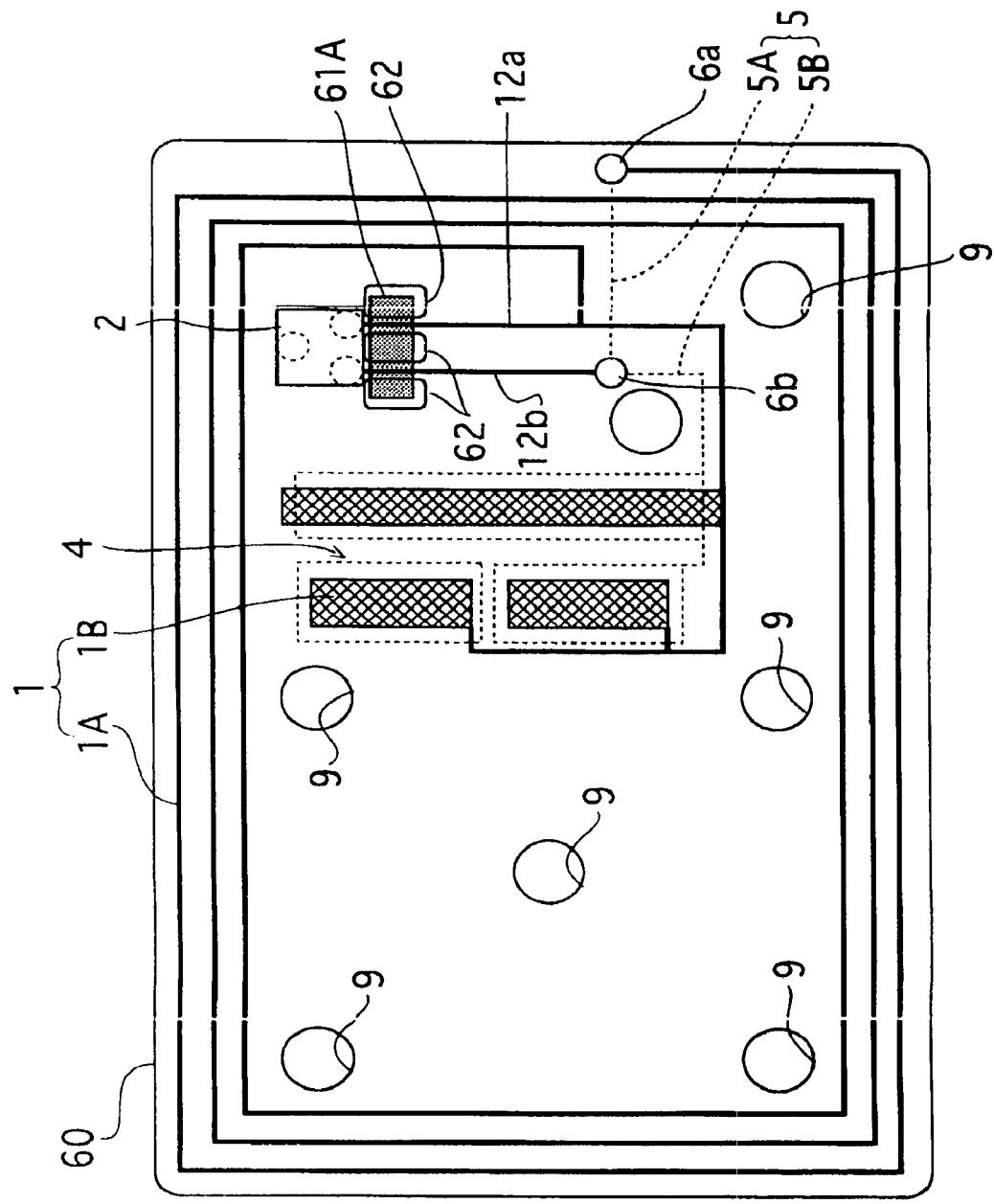
FIG. 18 is a plan view showing the structure of the circuit board 60.
Figure 19:
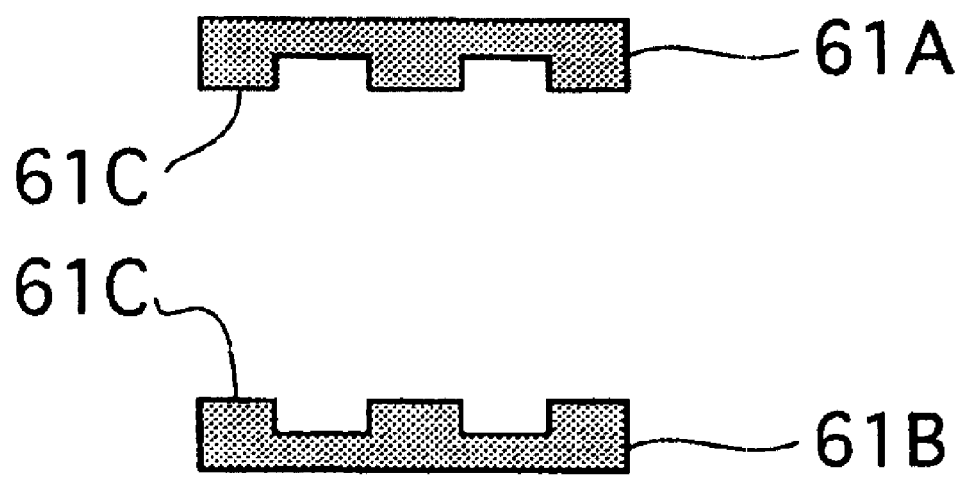
FIG. 19 is a side view showing the structure of sintered magnetic materials 61A and 61B mounted on the circuit board 60.

FIGS. 16 to 19 show the sixth embodiment of the present invention. FIG. 16 is a cross sectional side view of an IC card C6 of the embodiment, FIG. 17 is a plan view of a circuit board 60 constituting the IC card C6, FIG. 18 is a plan view showing the structure of the circuit board 60, and FIG. 19 is a side view of sintered magnetic materials 61A and 61B. In FIGS. 16 to 19, elements corresponding to those of the first embodiment are represented by using identical reference symbols, and the detailed description thereof is omitted.

In this embodiment, the noise absorbers for absorbing and removing noises inputting to and outputting from the IC chip 2 are constituted of a pair of sintered magnetic materials 61A and 61B surrounding the wiring sections 12a and 12b interconnecting the antenna pattern IA and IC chip 2.

In this embodiment in particular, the pair of sintered magnetic materials 61A and 61B is disposed in the area of the wiring sections 12a and 12b sealed with the sealing resin 7A together with the IC chip 2. The sintered magnetic materials 61A and 61B are also sealed with the sealing resin 7A.

The sintered magnetic materials 61A and 61B are formed by baking and solidifying sintered powders mixed and kneaded with soft magnetic powders. As shown in FIG. 19, legs 61C are formed at facing positions. The legs 61C and 61C of the sintered magnetic materials 61A and 61B are abutted via through holes 62 (FIGS. 17 and 18) formed through the circuit board 60 at facing positions to thereby surround the area of the wiring sections 12a and 12b near the IC chip 2 and improve an efficiency of absorbing noises inputting to and outputting from the IC chip.

According to the IC card C6 of the embodiment, similar to the first embodiment, noises inputting to and outputting from the IC chip 2 can be removed to exclude adverse effect on the operation of peripheral apparatus. It is also possible to exclude magnetic interference to electronic apparatuses placed near the IC card C6.

Since the sintered magnetic materials 61A and 61B structured as the noise absorbers are sealed with the sealing resin 7A together with the IC chip 2, the fragility of the sintered magnetic materials 61A and 61B can be compensated and the strength reliability can be retained.

Seventh Embodiment

Figure 20:
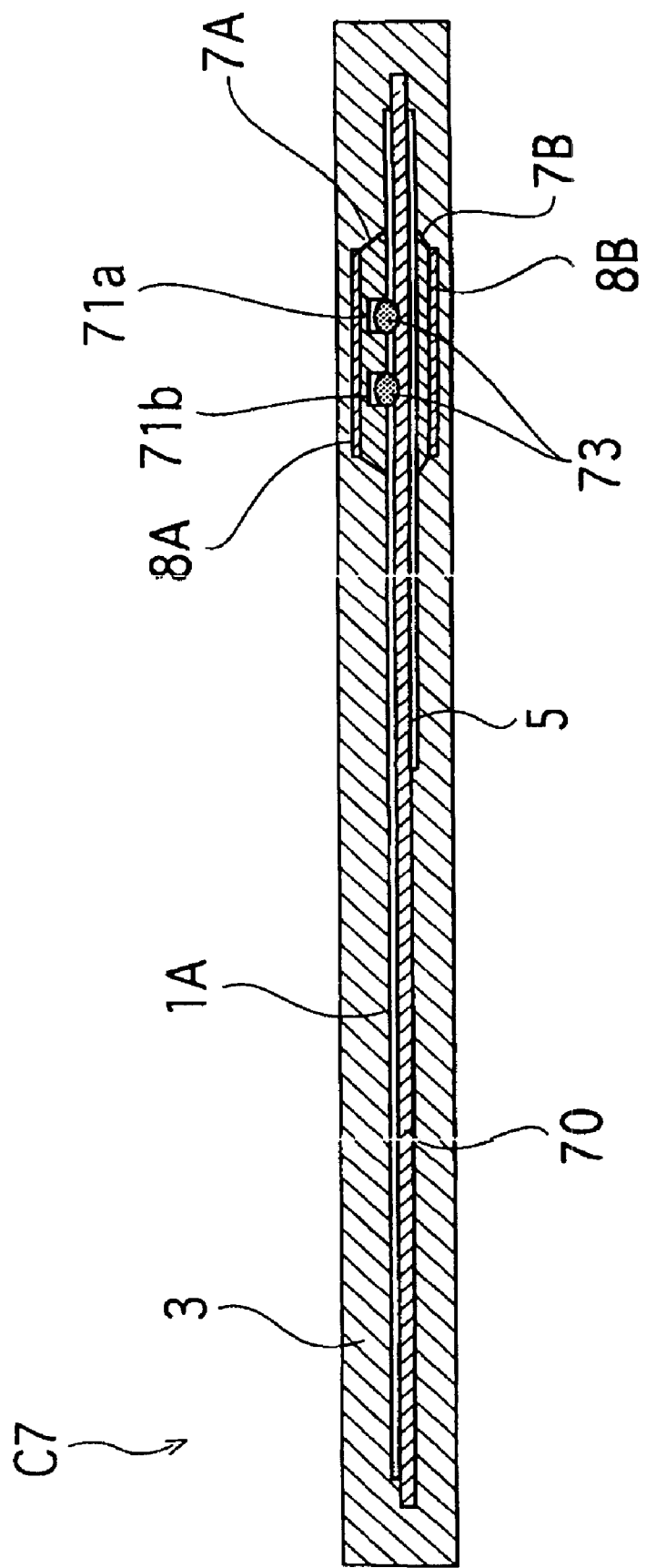
FIG. 20 is a cross sectional side view of an IC card C7 according to a seventh embodiment of the present invention.
Figure 21:
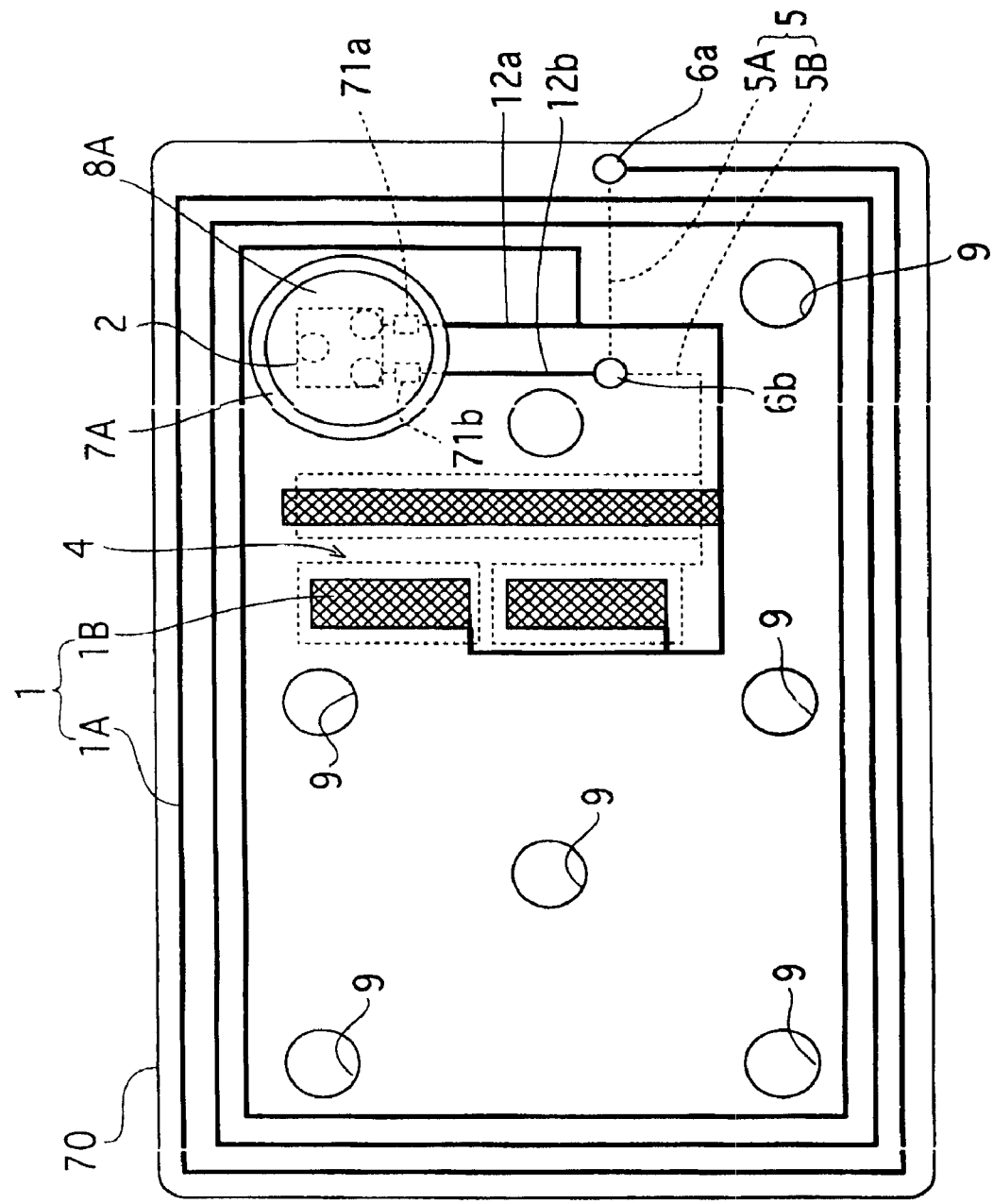
FIG. 21 is a plan view of a circuit board 70 constituting the IC card C7.
Figure 22:
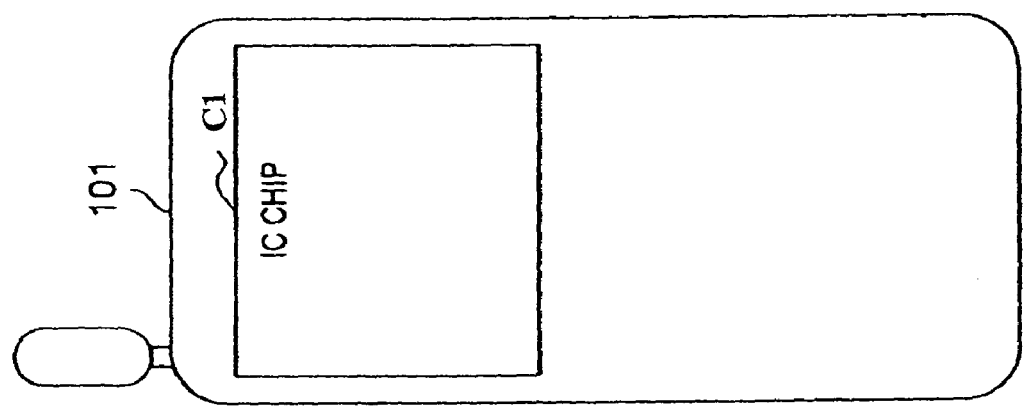
FIG. 22 is a plan view of a portable phone having a contactless IC card.

FIGS. 20 and 21 show the seventh embodiment of the present invention. FIG. 20 is a cross sectional side view of an IC card C7 of the embodiment, and FIG. 21 is a plan view of a circuit board 70 constituting the IC card C7. In FIGS. 20 and 21, elements corresponding to those of the first embodiment are represented by using identical reference symbols, and the detailed description thereof is omitted.

In this embodiment, the noise absorbers for absorbing and removing noises inputting to and outputting from the IC chip 2 are constituted of a pair of chip-type ferrite beads 71a and 71b mounted on the wiring sections 12a and 12b interconnecting the antenna pattern 1A and IC chip 2, by using bonding material such as solders 73 and 73.

In this embodiment in particular, the pair of ferrite beads 71a and 71b are mounted in the area of the wiring sections 12a and 12b sealed with the sealing resin 7A together with the IC chip 2. The ferrite beads 71a and 71b are also sealed with the sealing resin 7A.

Similar to the ferrite beads 11a and 11b described in the first embodiment, the ferrite beads 71a and 71b have a conductive layer partially constituting the wiring sections 12a and 12b and a magnetic layer for absorbing and removing noises (unnecessary radiation energy) inputting to and outputting from the IC chip 2. In this embodiment, the ferrite beads 71a and 71b are structured in such a size that the ferrite beads can be sealed with the sealing resin 7A.

According to the IC card C6 of the embodiment, noises inputting to and outputting from the IC chip 2 can be removed to exclude adverse effect on the operation of peripheral apparatus. It is also possible to exclude magnetic interference to electronic apparatuses placed near the IC card C7.

The embodiments of the present invention have been described above, however, it is obvious that the invention is not limited only to these embodiments, but various modifications are possible on the basis of technical ideas of the present invention.

For example, in the above-described embodiments, a so-called card-size non-contact IC card has been described as an example of the IC card of the present invention. The invention is not limited to the IC card of this type, but is applicable to all IC media capable of reading/writing recording information to an IC chip by using RFID technologies, such as non-contact IC tags and ID tags attached to each of products.

The IC card described in the embodiments is formed by sandwiching the circuit board with a plurality of card constituent sheets and thermally pressing and bonding the sheets. Instead, an IC card may be formed by sandwiching the circuit board by a pair of coating sheets via thermoplastic adhesive such as epoxy system. The invention is also applicable to the IC card of this type.

INDUSTRIAL APPLICABILITY

As described above, according to the IC card of the present invention, since the noise absorbers are provided which absorb and remove noise components generated in the IC chip, it is possible to absorb and remove noises inputting to and outputting from the IC chip of the IC card, so that unnecessary radiation from the IC card can be reduced and adverse effect on peripheral apparatus can be suppressed.

The invention claimed is:

1. A portable phone having a contact-less IC card with reader-writer functionality, the contact-less IC card comprising:
   a circuit board;
   an IC chip mounted on the circuit board;
   an antenna wiring on the circuit board;
   a noise absorber on the circuit board to absorb and remove noise input to and output from a communication operation of the portable phone; and
   a pair of card-shaped sheets sandwiching the circuit board therebetween,
   wherein the noise absorber is a magnetic layer.

2. The contact-less IC card according to claim 1, wherein the noise absorber is provided in a wiring area on the circuit board to connect the antenna wiring and the IC chip.

3. The contact-less IC card according to claim 1, wherein the IC chip is sealed on the circuit board with a sealing resin, and the magnetic layer is formed by mixing and kneading a magnetic material with the sealing resin.

4. The contact-less IC card according to claim 1, wherein the IC chip is sealed on the circuit board with sealing resin, and the noise absorber is sealed with the sealing resin together with the IC chip.

5. The contact-less IC card according to claim 1, further comprising:
   an aperture provided in at least one of the plurality of card-shaped sheets to provide access to an IC mount port.

6. The contact-less IC card according to claim 1, further comprising:
   an aperture provided in at least one of the plurality of card-shaped sheets to partially surround an extension from the circuit board.

7. The contact-less IC card according to claim 1, wherein the noise absorber is formed on the circuit board to at least partially cover the wiring area.

8. The contact-less IC card according to claim 1, wherein the noise absorber is a chip-type ferrite bead.

9. The contact-less IC card according to claim 1, wherein the noise absorber at least partially provides the antenna wiring.

10. The contact-less IC card according to claim 1, wherein the noise absorber passes through the circuit board so as to at least partially surround the wiring area.

11. A method of manufacturing a portable phone having a contact-less IC card with reader-writer functionality, the method comprising:
    mounting an IC chip on a circuit board on which antenna wiring is formed;
    sandwiching the circuit board and the IC chip between a plurality of card-shaped sheets; and
    disposing a noise absorber on the circuit board to absorb and remove a noise input to and output from a communication operation of the portable phone,
    wherein the noise absorber passes through the circuit board so as to at least partially surround a wiring area on the circuit board.

12. The method according to claim 11, wherein the noise absorber is a magnetic layer formed on the circuit board to at least partially cover a wiring area.

13. The method according to claim 11, wherein the noise absorber is a chip-type ferrite bead.

14. The method according to claim 11, wherein the noise absorber provides at least a part of the antenna wiring.

15. The method according to claim 11, wherein the noise absorber passes through the circuit board so as to at least partially surround the wiring area.

16. A portable phone having a contact-less IC card with reader-writer functionality, the contact-less IC card comprising:
    a circuit board with antenna wiring;
    an IC chip mounted on the circuit board and connected to the antenna wiring via a connector;
    a noise absorber chip-type ferrite bead positioned on the connector to absorb and remove interference from a communication operation of the portable phone;
    an inner core sheet positioned on a side of the circuit board having an aperture to accommodate an extension from the circuit board; and
    an outer core sheet to close a side of the aperture opposite from the circuit board.

17. The contact-less IC card according to claim 16, wherein the noise absorber is a magnetic layer.

18. The contact-less IC card according to claim 16, wherein the noise absorber is formed on the circuit board to at least partially cover the wiring area.

19. The contact-less IC card according to claim 16, wherein the noise absorber provides at least a part of the antenna wiring.

20. The contact-less IC card according to claim 16, wherein the noise absorber passes through the circuit board so as to at least partially surround a wiring area.

* * * * *

UNITED STATES PATENT AND TRADEMARK OFFICE
CERTIFICATE OF CORRECTION

PATENT NO. : 7,883,022 B2
APPLICATION NO. : 12/183661
DATED : February 8, 2011
INVENTOR(S) : Isao Takahashi and Junichi Sawada It is certified that error appears in the above-identified patent and that said Letters Patent is hereby corrected as shown below:

On the Cover page of the patent:

(75) Inventors: "Isao Takahashi, Tokyo (JP)"

should be

(75) Inventors: --Isao Takahashi, Miyagi (JP)--

(63) "Continuation of application No. 10/569,917 filed on Feb. 28, 2006, Now Pat. No. 7,451,934"

should be

(63) --Continuation of application No. 10/569,917 filed on Feb. 28, 2006, filed as application No. PCT/JP2004/012913 on Aug. 31, 2004, now Pat. No. 7,451,934--

The Foreign Application Priority Data is missing. Please add:

(30) Foreign Application Priority Data

--Sep 1, 2003  (JP)  P2003-309103--

Signed and Sealed this
Twenty-sixth Day of April, 2011

David J. Kappos
*Director of the United States Patent and Trademark Office*